(12) United States Patent
Mehra et al.

(10) Patent No.: US 11,783,610 B2
(45) Date of Patent: *Oct. 10, 2023

(54) DOCUMENT STRUCTURE IDENTIFICATION USING POST-PROCESSING ERROR CORRECTION

(71) Applicant: Adobe Inc., San Jose, CA (US)

(72) Inventors: Ashutosh Mehra, Uttar Pradesh (IN); Md Nadeem Akhtar, Uttar Pradesh (IN); Pranav Kumar, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,793

(22) Filed: Apr. 22, 2022

(65) Prior Publication Data

US 2022/0245958 A1 Aug. 4, 2022

Related U.S. Application Data

(63) Continuation of application No. 16/655,365, filed on Oct. 17, 2019, now Pat. No. 11,321,559.

(51) Int. Cl.
*G06K 9/00* (2022.01)
*G06V 30/413* (2022.01)
(Continued)

(52) U.S. Cl.
CPC .......... *G06V 30/413* (2022.01); *G06N 20/00* (2019.01); *G06V 10/454* (2022.01); *G06V 10/82* (2022.01); *G06V 30/412* (2022.01); *G06V 30/414* (2022.01)

(58) Field of Classification Search
CPC .......... G06K 9/00456; G06K 9/00449; G06K 9/00463; G06K 9/4628; G06N 20/00; G06N 3/0454
See application file for complete search history.

(56) References Cited

U.S. PATENT DOCUMENTS 5,307,266 A * 4/1994 Hayashi ............... G06F 16/93
715/201
7,346,838 B2 * 3/2008 Martyn ................ G06T 19/00
715/255

(Continued)

OTHER PUBLICATIONS

Yang, et al., "Learning to Extract Semantic Structure from Documents Using Multimodal Fully Convolutional Neural Networks," The IEEE Conference on Computer Vision and Pattern Recognition (CVPR), 2017. 16 pages.

(Continued)

*Primary Examiner* — Christopher M Brandt
(74) *Attorney, Agent, or Firm* — FINCH & MALONEY PLLC

(57) ABSTRACT

A method comprises determining instance bounds associated with each of one or more structural elements in a document using a machine learning model. The method further comprises determining an error in the instance bounds associated with a particular one of the one or more structural elements. The method further comprises correcting the error in the instance bounds associated with the particular structural element using document content associated with the particular structural element, thereby generating corrected instance bounds associated with the particular structural element. The method further comprises generating a structural map of the document based on the corrected instance bounds.

20 Claims, 13 Drawing Sheets

(51) Int. Cl.
*G06N 20/00* (2019.01)
*G06V 30/412* (2022.01)
*G06V 30/414* (2022.01)
*G06V 10/82* (2022.01)
*G06V 10/44* (2022.01)

(56) References Cited

U.S. PATENT DOCUMENTS

| | | | |
|---|---|---|---|
| 8,208,737 B1* | 6/2012 | Ie | G06V 30/416 |
| | | | 382/229 |
| 2004/0205081 A1 | 10/2004 | Chao | |
| 2009/0327210 A1* | 12/2009 | Liu | G06F 16/353 |
| 2013/0124979 A1* | 5/2013 | Chang | G06F 40/117 |
| | | | 715/243 |
| 2013/0343658 A1* | 12/2013 | Dejean | G06V 30/414 |
| | | | 382/203 |
| 2016/0196249 A1* | 7/2016 | Allen | G06F 40/169 |
| | | | 715/230 |
| 2017/0337443 A1* | 11/2017 | Kolton | G06T 7/74 |
| 2019/0049987 A1 | 2/2019 | Djuric et al. | |
| 2020/0019769 A1 | 1/2020 | Leibovitz et al. | |
| 2021/0117666 A1 | 4/2021 | Kaynig-Fittkau et al. | |
| 2021/0157975 A1* | 5/2021 | Gelosi | G06F 40/166 |

OTHER PUBLICATIONS

Notice of Allowance received in U.S. Appl. No. 16/655,363, dated Mar. 9, 2022, 4 pages.

* cited by examiner

DOCUMENT STRUCTURE IDENTIFICATION USING POST-PROCESSING ERROR CORRECTION

CROSS-REFERENCE TO RELATED APPLICATION

This application is a continuation of U.S. patent application Ser. No. 16/655,365 (filed 17 Oct. 2019), the entire disclosure of which is hereby incorporated by reference herein.

FIELD OF THE DISCLOSURE

This disclosure relates generally to the field of document processing, and more particularly, to techniques for accurately identifying document structures using a machine learning model.

BACKGROUND

Conventional scanning of physical documents into electronic documents and OCR techniques on electronic image-based documents (like .pdf) have a limited ability to automatically detect various structural elements of the physical and electronic documents, particularly with respect to any electronic documents that have no intrinsic data regarding their structural elements. As a result, there may be errors in identifying the classification or location of certain structural elements of the given document. In some cases, a user can manually input the classification and/or location of certain structural elements in the electronic document, but this is costly and inconvenient, especially for large documents. Therefore, complex and non-trivial issues associated with identifying structural elements of electronic documents remain due to the limitations of these existing techniques.

SUMMARY

Techniques are provided for improving the identification of document structural elements. In one embodiment, a methodology includes determining location and classification for each of a plurality of structural elements on a page of the document using a machine learning (ML) model and determining one or more errors in the location or classification for at least one of the plurality of structural elements. The method further includes correcting each instance of the one or more errors for a corresponding structural element using document content spatially adjacent to the corresponding structural element on the page of the document, and generating a structural map of the page of the document based on the determined location and classification for each of the plurality of structural elements. Any number of such use cases or applications will be appreciated in light of this disclosure. By way of an example, any number of non-transitory machine-readable mediums (e.g., embedded memory, on-chip memory, read only memory, random access memory, solid state drives, and any other physical storage mediums) can be used to encode the instructions that, when executed by one or more processors, cause the techniques provided herein to be carried out. These and other advantages and alternative embodiments will be apparent in light of this disclosure.

BRIEF DESCRIPTION OF THE DRAWINGS

The accompanying drawings are not intended to be drawn to scale.

DETAILED DESCRIPTION

Figure 1:
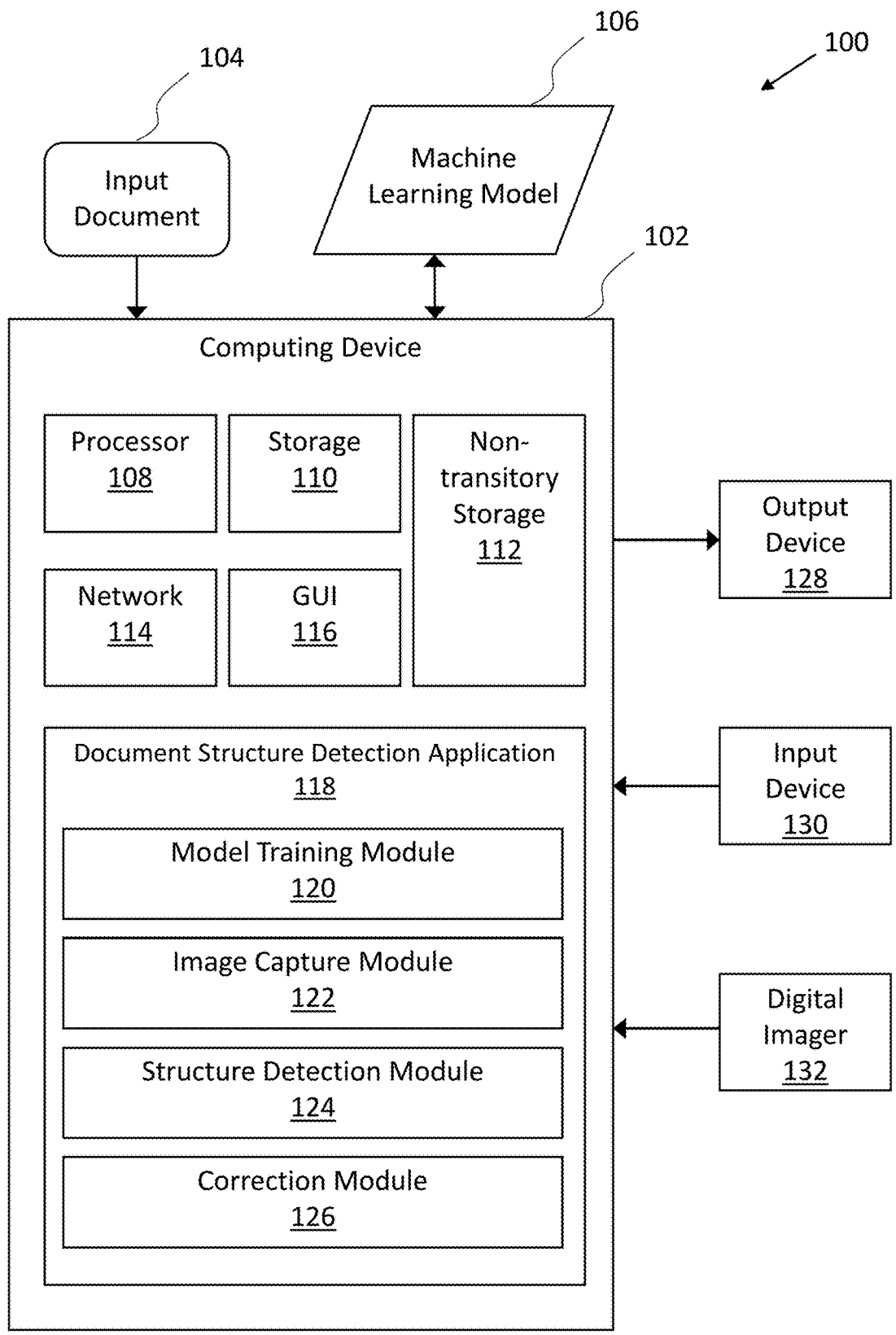
FIG. 1 shows an example system for identifying structural elements of a document using a machine learning model and image processing algorithms, in accordance with an embodiment of the present disclosure.

Techniques are disclosed for identifying, and correcting via post-processing, various structural elements within an electronic document using a combination of a machine learning model and image processing algorithms. Some types of digital documents do not have structural tagging or other intrinsic data regarding its document structural elements (generally, a document that has no ability to be self-aware or otherwise communicate or make known its structural elements, whether actively or passively). Examples of such digital documents include images of documents (or more simply, imaged document), some word processing documents, and some PDF documents, as will be appreciated. In some embodiments, an electronic document, as used herein, can refer to either a digital document that does not have intrinsic data regarding its document structural elements or to a digital document that does have intrinsic data regarding its document structural elements. As used herein, the term "document structural elements" or similarly the "structural elements of a document" refer to any text or figure or object features in the document. Example classifications of document structural elements include headings, list items, tables, figures, body text, and footnotes, to name a few examples.

A given electronic document may include various classifications of structural elements located on each page of the electronic document. Correctly identifying the locations and classifications of each of the structural elements on a given page has numerous benefits. In one example, the location and/or classification of the structural elements can be used to generate a structural map of each page of the electronic document. In one such example case, the structural map can be used to automatically generate a table of contents and/or a table of figures for the electronic document. More generally, the location and/or classification of the structural elements provided in the structural map can be used by a user to quickly navigate through the electronic document by jumping to various portions of the document based on a desired structural element type. In another such example case, the structural map of each page of the electronic document can be used to determine a different display scheme for each page of the electronic document. The display scheme may be used, for instance, to display the electronic document on a smaller-sized screen and make the electronic document easier to read on the screen. For example, a PDF document could be re-displayed on a smartphone screen by using the display scheme determined from the structural map of each page of the electronic document. Displaying the PDF document using the determined display scheme may involve smoothly wrapping certain heading structures or body text structures to fit the smaller screen width, adjusting tables to swipe vertically and horizontally on a smaller screen, hiding footnotes behind reference symbols, collapsing figures or text asides into smaller poster images that can expand when clicked on, and/or suppressing background imagery to improve readability of the text, to name a few examples.

The techniques may be embodied in devices, systems, methods, or machine-readable mediums, as will be appreciated. According to one embodiment of the present disclosure, a system is provided that includes a machine learning (ML) model and a post-processing error correction module. The ML model is used to identify the structural elements of an electronic document based on deterministic algorithms subsequent to a learning phase to train the model. The learning phase may involve feeding the ML model hundreds or thousands or more of electronic documents to train the ML model how to identify particular structures. However, the output of such trained ML models can still suffer from various errors with respect to one or both of the identified location and classification of certain structural elements in the electronic document. As a result, portions of the electronic document may be misclassified, or not classified at all, leading to issues with downstream processing of the electronic document. Accordingly, a post-processing error correction operation augments the ML model and uses adjacent document content to correctly classify misclassified structural elements or to classify structural elements that were not classified by the ML model. The adjacent document content can vary from one embodiment to the next. In some such embodiments, document content adjacent to a particular structural element that is being classified includes other structural elements and/or graphics in close proximity to that particular structural element (e.g., directly above, directly below, or on either side of). Numerous examples are described herein with reference to any one of FIGS. 5-12, and many others will be appreciated in light of this disclosure.

FIG. 1 shows an example system 100 for identifying and correcting structural elements in an electronic document, in accordance with an embodiment of the present disclosure. The system 100 includes a computing device 102 having a processor 108, a storage 110, one or more non-transitory storage media 112, a network interface 114, and a Document Structure Detection Application 118. System 100 may also have a graphical user interface (GUI) 116 that may include a display and a user input device. In some embodiments, GUI 116 represents a command-line interface.

According to some embodiments, processor 108 of the computing device 102 is configured to execute the following modules of Document Structure Detection Application 118, each of which is described in further detail below: Model Training Module 120, Image Capture Module 122, Structure Detection Module 124 and Correction Module 126. Computing device 102 is further configured to receive, as inputs, at least one document image 104 or other object, and a ML model 106. According to some embodiments, ML model 106 provides, to the computing device 102, object models representing shapes, styles, or other formatting associated with particular classifications of document structural elements, learned using machine learning techniques. Each document image 104 represents an electronic document (or a particular page of an electronic document) to be processed by computing device 102. In some embodiments, computing device 102 is further configured to produce an output image of the document (or page of the document) that is based at least in part on the input document image 104 and the identified structural elements of the document image 104. The output image can, for example, include a digital image of the document (or page) appearing in the input document image 104 with one or more of the structural elements in the document marked, labeled, indicated, or identified in a human readable or machine-readable manner, such as variously described in this disclosure. Any number of standard or proprietary digital images (e.g., JPEG, bitmap, PNG, TIFF, QuickTime VR, and PANO) can be used for the input document image 104. Each of the modules 120, 122, 124, and 126 can be used in conjunction with each other in any order for identifying the structural elements of the input document image 104.

Computing device 102 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices.

Computing device 102 includes one or more storage devices 110 or non-transitory computer-readable media 112 having encoded thereon one or more computer-executable instructions or software for implementing techniques as variously described in this disclosure. The storage devices 110 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 110 can include other types of memory as well, or combinations thereof. The storage device 110 can be provided on the computing device 102 or provided separately or remotely from the computing device 102. The non-transitory computer-readable media 112 can include, but are not limited to, one or more types of hardware memory, non-transitory tangible media (for example, one or more magnetic storage disks, one or more optical disks, one or more USB flash drives), and the like. The non-transitory computer-readable media 112 included in the computing device 102 can store computer-readable and computer-executable instructions or software for implementing various embodiments. The computer-readable media 112 can be provided on the computing device 102 or provided separately or remotely from the computing device 102.

The computing device 102 also includes at least one processor 108 for executing computer-readable and computer-executable instructions or software stored in the storage device 110 or non-transitory computer-readable media 112 and other programs for controlling system hardware. Virtualization can be employed in the computing device 102 so that infrastructure and resources in the computing device 102 can be shared dynamically. For example, a virtual machine can be provided to handle a process running on multiple processors so that the process appears to be using only one computing resource rather than multiple computing resources. Multiple virtual machines can also be used with one processor. Network interface (I/F) 114 can be any appropriate network chip or chipset which allows for wired or wireless connection between the computing device 102 and a communication network (not shown) and other computing devices and resources.

A user can interact with the computing device 102 through an output device 128, such as a screen or monitor, which can display one or more user interfaces or images, including input document image 104 and/or the output image, as provided in accordance with some embodiments. As noted above, in some embodiments, output device 128 displays the various structural elements of input document image 104 using a different display scheme determined based on the identified locations and classifications of the various structural elements. The output device 128 can also display other aspects, elements, information or data associated with input document 104 or the Document Structure Detection Application 118. The computing device 102 can include input or input/output devices 130 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 102 can further include a digital imager 132 configured to acquire an input document image 104. The digital imager 132 can be a digital camera, digital document scanner, or other device configured to acquire the input document image 104. The computing device 102 may include any other suitable conventional I/O peripherals. In some embodiments, computing device 102 includes or is operatively coupled to various suitable devices for performing one or more of the aspects as variously described in this disclosure.

The computing device 102 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 102 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as any of the modules 120, 122, 124, 126, the GUI 116, or any combination of these, may be implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 102, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating systems, are not shown but will be apparent.

ML model 106 can be pre-determined; however, in some embodiments machine learning techniques can be used to further train ML model 106 using various types of synthetic and real-world data. According to some embodiments, Model Training Module 120 is configured to train the ML model 106 to identify and classify various document structural elements using a received set of input documents. For example, Model Training Module 120 may be designed to feed the ML model 106 millions or more of electronic documents to train ML model 106 to identify particular structures. ML model 106 may then be used to determine the probability that a given structural element on a given input document image 104 belongs to a certain classification. ML model 106 may also be used to determine the instance bounds (e.g., location) of the given structural element. The probability can then be used to select classifications for each identified structural element. In some embodiments, ML model 106 learns various model parameters from the training documents, such as parameters associated with font style, font location on the page, font size, graphical symbols, arrangement of line graphics, alignment of text, structural grouping of context within tables, etc. The model parameters can then be applied to the various structural elements on the input document image to determine classification probabilities and instance bounds for each of the structural elements.

In accordance with an embodiment of the present disclosure, ML model 106 of FIG. 1 includes a convolutional neural network (CNN) trained on the task of object detection. The neural network may be trained by Model Training Module 120 to assist with identifying structural elements within an electronic document. The training data can include, for instance, around a million document pages that have been manually annotated by proving the instance bounds and classification of each structural element on the page. During the training process, the ML model learns the object detection task of predicting all the instances on the page. In some embodiments, the architecture of ML model 106 involves a series of convolutional and pooling layers ending with feed-forward layers for the eventual classification and bounding-box regression task for the structural elements on a given page. The model may be a single-shot detector, which is a proposal-less CNN architecture where the model makes a single forward pass over the entire input image and treats detection as a regression problem by predicting (a) the set of instance bounds as regression offsets from suitable anchors, (b) probabilities of how relevant/strong that prediction is (objectness), and (c) probabilities for classifications. The anchors refer to center points of the structural elements, since document structures such as body text, list items, or tables have no standard aspect ratio. In some embodiments, the CNN contains, for example, 30 convolutional layers, 5 pooling layers, 5 batch-normalization layers, and final sigmoid and softmax layers to predict location and classification of the document structural elements.

According to some embodiments, Image Capture Module 122 is configured to capture the input document image 104 using digital imager 132. For example, a user may take a photograph of, or scan, a paper document using digital imager 132. It should be understood that Image Capture Module 122 provides one example method for procuring input document image 104, and that input document image 104 may also be received via network 114, loaded from storage 110, or loaded from storage in an external device. In some examples, each page of a .pdf document is rendered into a bitmap before being they are each fed to ML model 106.

According to some embodiments, Structure Detection Module 124 uses the ML model 106 to determine location (e.g., instance bounds) and/or classification for each of one or more document structural elements on input document image 104. Structure Detection Module 124 may generate a structural map for each page of a document that identifies the classification and/or location of the various structural elements. Further details of the operations performed by Structure Detection Module 124 are provided in reference to FIG. 2.

According to some embodiments, Correction Module 126 uses post-processing techniques to correct errors in the classification and/or location of certain ones of the document structural elements. These errors may occur due to inconsistent or inaccurate analysis performed by Structure Detection Module 124. The post-processing techniques involve using document content adjacent to or overlapping with the erroneously classified structural element to correct the error. Further details of the operations performed by Correction Module 126 are provided in reference to FIG. 3.

Figure 2:
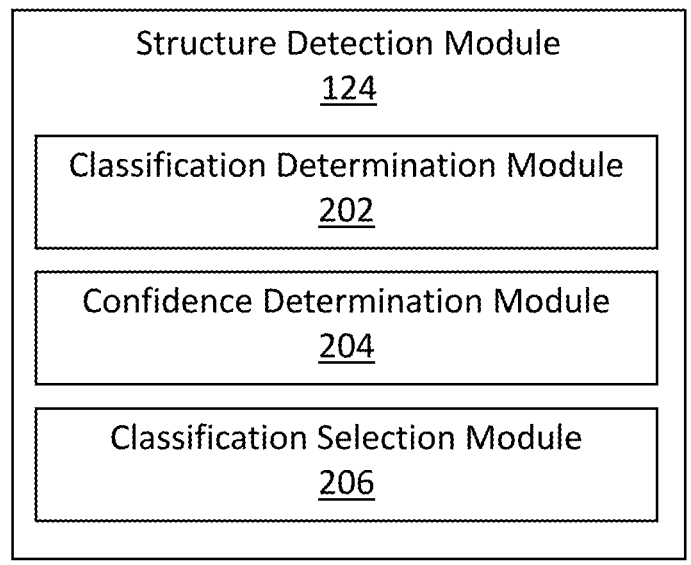
FIG. 2 is a functional diagram of an example document structure detection module that employs machine learning to detect and classify structural elements of a document, in accordance with an embodiment of the present disclosure.

FIG. 2 is a functional diagram of the Structure Detection Module 124 in further detail, in accordance with an embodiment of the present disclosure. The Structure Detection Module 124 includes a Classification Determination Module 202, a Confidence Determination Module 204, and a Classification Selection Module 206. According to some embodiments, Structure Detection Module 124 operates to identify structural elements on a page-by-page basis using ML model 106. In other words, structural elements that span across pages will not be identified as a single structural element, but rather as separate structural elements for each page.

The Classification Determination Module 202 determines one or more possible classifications for each structural element in an electronic document, in accordance with some embodiments. For example, a segment of text in the document could be identified as either being a heading, body text, or a footnote. The possible classifications are determined using the ML model 106 based on similarities between the structural element and previously identified structural elements having certain known classifications during training of the ML model 106 or based on the application of learned model parameters to the structural element of the input electronic document. In some examples, only one classification is determined for a given structural element, representing full confidence from the ML model 106 that the determined classification is correct. Any number of classifications may be identified as possible correct classifications for any number of structural elements in the electronic document.

The Confidence Determination Module 204 determines a confidence metric for each of the determined possible classifications from Classification Determination Module 202 for a given structural element, in accordance with some embodiments. The confidence metric may represent a probability (given out of 1.0) that an identified possible classification is the correct classification for the given structural element. The probabilities are determined by the ML model. Following the example provided above, a segment of text identified as being either a heading, body text, or a footnote may have confidence metrics of 0.7 (or 70%), 0.2 (or 20%), and 0.1 (or 10%) respectively assigned to the possible classifications. In some embodiments, the assigned confidence metrics for each possible classification do not add up to 1.0 (or 100%). In some embodiments, only one classification may be determined for a given structural element, in which case the one classification is assigned a confidence metric of 1.0 (or 100%) or is not assigned a confidence metric.

The Classification Selection Module 206 selects one of the possible classifications to assign to a given structural element based on the determined confidence metrics from Confidence Determination Module 204, in accordance with some embodiments. Following the example provided above, for a segment of text having confidence metrics of 0.7 (or 70%) for heading, 0.2 (or 20%) for body text, and 0.1 (or 10%) for footnote, Classification Selection Module 206 would select heading as the classification to assign to the given segment of text based on it having the highest confidence metric. In some embodiments, only one classification may be determined for a given structural element, in which case Classification Selection Module 206 is not used or merely selects the only possible provided classification.

Figure 3:
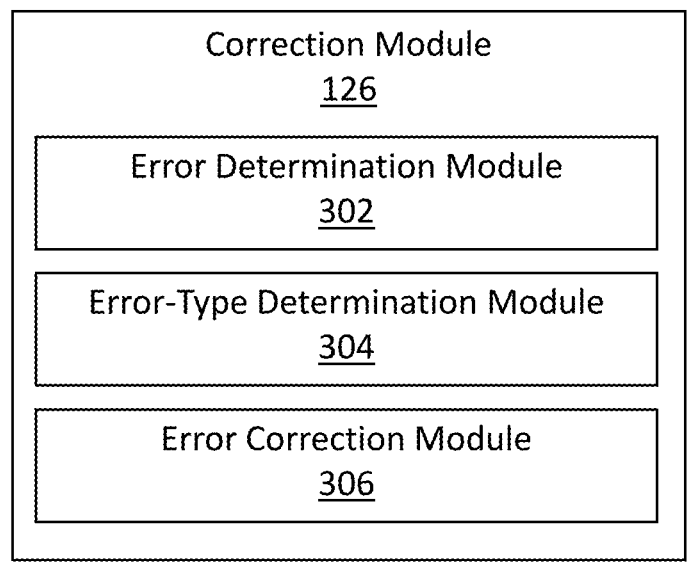
FIG. 3 is a functional diagram of an example correction module for correcting structural elements of a document that have been misclassified by the document detection module of FIG. 2, in accordance with an embodiment of the present disclosure.

FIG. 3 is a functional diagram of the Correction Module 126 in further detail, in accordance with an embodiment of the present disclosure. The Correction Module 126 includes an Error Determination Module 302, an Error-Type Determination Module 304, and an Error Correction Module 306. According to some embodiments, Correction Module 126 operates to correct misclassified structural elements on a page-by-page basis, as discussed above.

The Error Determination Module 302 considers each of the structural elements on a given page of the electronic document and determines if a possible error exists in either or both the classification and location of the structural element, in accordance with some embodiments. A possible error may exist if the confidence metric for a selected classification for the given structural element is below a threshold value. For example, if a threshold confidence metric is at 70%, a structural element provided the "heading" classification, but with only a confidence metric of 55% (while the "body text" classification had a confidence metric of 45%), would be identified by Error Determination Module 302 as potentially having an erroneous classification since the 55% confidence metric is below the threshold value. Other threshold values for determining potentially erroneous classification include 95%, 90%, 85%, 80%, or 75%. Another example for determining a potentially erroneous classification include situations when at least two or at least three possible classifications are determined for a given structural element.

In some embodiments, Error Determination Module 302 determines a potentially erroneous situation with regards to the instance bounds of a given structural element. The instance bounds identify the extent (e.g., area or location on the page) for a given structural element. In some cases, the instance bounds of the given structural element may be determined to be too small (not including the full structural element) or too large (including other adjacent structural elements).

The Error-Type Determination Module 304 determines what type of error has occurred (if an error has occurred) for a given structural element, in accordance with some embodiments. In some embodiments, more than one type of error can apply to a given structural element. Error types generally fall into one of three classifications—classification errors, instance boundary errors, and data loss errors. Classification errors, as the name suggests, result from misclassifying a particular structural element. Instance boundary errors result from incorrect instance bounds of a given structural element. Data loss errors occur when structural elements have not been classified. In some embodiments, document content surrounding the structural element with the identified error can be used by Error-Type Determination Module 304 to help determine what kind of error has occurred. For example, patterns of particular classifications found in adjacent text on the page can be observed to determine that a given structural element having a different classification likely has a classification error. Particular examples of classification errors, instance boundary errors, and data loss errors are explained in more detail herein with reference to FIGS. 5-12.

The Error Correction Module 306 uses adjacent or overlapping document content on the page of the electronic document to correct any of the errors associated with a given structural element, in accordance with some embodiments. The adjacent document content can include other structural elements or page graphics. In some embodiments, the classification or location of the adjacent structural elements can be used to determine how to correct the one or more errors associated with the given structural element.

In some embodiments, Error Correction Module 306 utilizes intrinsic document content (herein also referred to as rich information) associated with the electronic document to determine various characteristics of the identified structural elements. Electronic documents (PDFs, Word, etc) have page content representations that contain the aforementioned rich information associated with text characters/glyphs, graphics (vectors, lines, rectangles), and other images on the page. The rich information can include details about a given structural element such as, for example, its bounding box, general type (text, graphic, vector, etc.), font properties (for text structures), and location or size of the elements on the page. For example, the rich information associated with the document may be used to identify that certain text structures are bolded, underlined, and/or italicized. The rich information may be used to identify spatial relationships (e.g., alignment or distance) between the identified structural elements. For example, bounding boxes around adjacent structural elements may share a same or aligned edge. In another example, structural elements may be considered adjacent if their bounding box edges are within a threshold spacing from one another. Furthermore, gap distances between structural elements can be determined based on distance (e.g., number of pixels) between edges of the bounding boxes associated with the structural elements. Even scanned documents typically have a hidden text layer that be used to provide rich information regarding the text type and associated bounding boxes. Accordingly, Error Correction Module 306 may use both the output from the ML model (e.g., possible classifications with corresponding confidence scores) and the rich information associated with the electronic document to perform the post-processing error correction of the determined classification and/or location of the structural elements. Particular examples of correcting various types of errors using the output from the ML model and the rich information associated with the document are explained in more detail herein with reference to FIGS. 5-12.

Although discussion of the various sub-modules of Correction Module 126 have been with regards to a single given structural element, it should be understood that the operations of Correction Module 126 can be applied across any or all structural elements on each page of an electronic document. Furthermore, as discussed above, Correction Module 126 may be configured to operate on a page-by-page basis—identifying and correcting errors found on each separate page.

Figure 4:
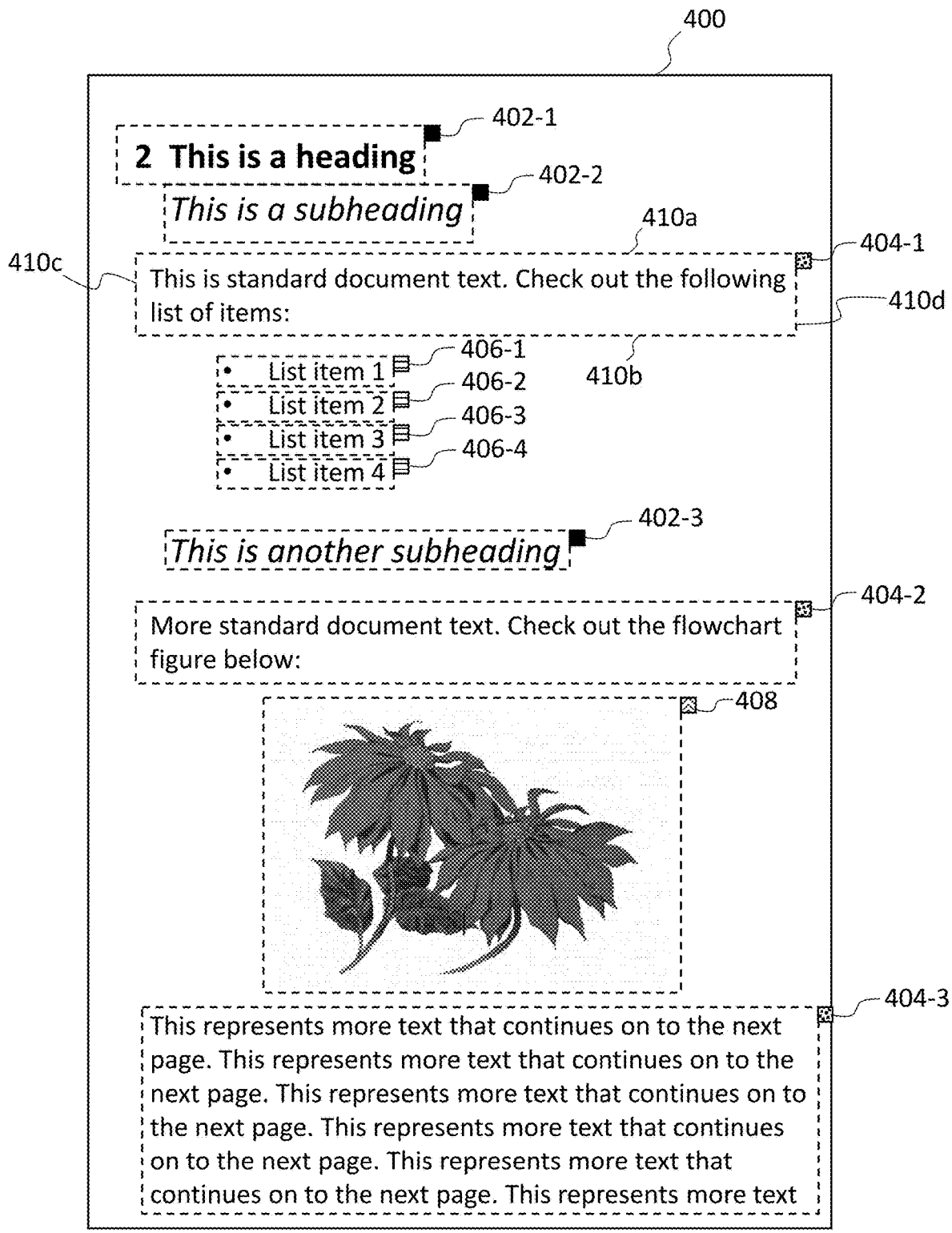
FIG. 4 shows an example electronic document having various identified structural elements, in accordance with an embodiment of the present disclosure.

FIG. 4 illustrates an example page 400 of an electronic document having various identified structural elements, according to an embodiment. Page 400 may be any page of an image file such as a PDF file or any other type of digital image (e.g., JPEG, bitmap, PNG, TIFF, QuickTime VR, and PANO). Structure Detection Module 124 may be used to identify the presence of the various structures on page 400. For the ease of illustration, each identified structural element in FIG. 4 has been provided with a dashed box.

As noted above, different classifications of structural elements can exist on any given page. For example, heading classifications 402-1 to 402-3 may be identified based on particular characteristics, such as the font style/size or placement on page 400, to name a few examples. In another example, body text classifications 404-1 to 404-3 may be identified based on particular characteristics, such as the density of the text or font style/size, to name a few examples.

In another example, list item classifications 406-1 to 406-4 may be identified based on particular characteristics, such as the organized nature of the text, bullet point graphics, or font style/size, to name a few examples. In another example, a figure classification 408 may be identified based on particular characteristics, such as the use of non-text graphics or color, to name a few examples. Each of the various identified structural elements may have their associated classification assigned by Structure Detection Module 124 using ML model 106

As noted above, each identified structural element includes associated instance bounds, such as instance bounds 410a-410d used to identify the location of the text block structure having the body text classification 404-1. Instance bound 410a ensures that the body text classification 404-1 does not include the text of heading classification 402-2. Similarly, instance bound 410b ensures that the body text classification 404-1 does not include the text of list item classification 406-1. Instance bounds 410c and 410d define the text width across page 400. Identifying particular structural elements using instance bounds is an object-detection scheme as opposed to a pixel-detection scheme, which uses patterns of the pixel graphics to determine the existence of different document structures.

FIGS. 5-12 illustrate various examples of errors that may result from the output of ML model 106 with regards to classification and/or location (e.g., instance bounds) of certain structural elements, according to some embodiments. Each of the examples is not considered to be limiting, and the error-correction technique may apply to any other type of structural element beyond the one used in the particular example.

Figure 5A:
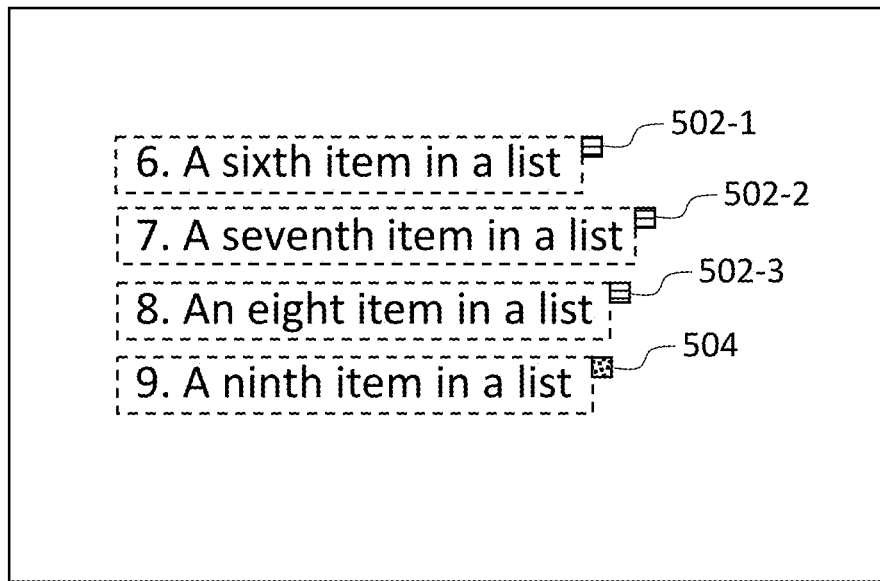
FIG. 5A illustrates a first example error for a document structural element.

FIG. 5A illustrates an example of a series of list items having an erroneously classified member in the list. In this example, list item classifications 502-1 to 502-3 are followed by a body text classification 504. The body text classification 504 is incorrect as this text is another element of the list and should instead be classified as also being a list item classification. This is an example of a classification error. Note that in this example, the instance bounds of each structural element are correct.

According to an embodiment, the classification error is corrected using adjacent document content. In this example, there was likely ambiguity in the ML model output between whether the ninth list item text should be classified as "list item" or "body text." When such ambiguities occur, various operations can be performed involving the adjacent document content to determine which classification is correct. For example, a pattern from the adjacent text can be observed to identify the use of sequential numbers (e.g., 6, 7, 8) with the given structural element having the next number in the pattern (e.g., 9). This information strongly suggests that the correct classification for the given structural element should be as a "list item" rather than as "body text." In another example, a pattern of repeated use of particular graphics or glyphs (such as bullet points) can be used to determine that the given structural element should be a "list item." In yet another example, text alignment on the page for adjacent textual structural elements that are above, below, or both in relation to the given structural element to be corrected can be used to determine that the given structural element should have the same classification as the adjacent textual structural elements (which in this case would correct the structural element to be classified as a "list item"). Font properties may be used as well to determine similarities between adjacent structural elements.

Figure 5B:
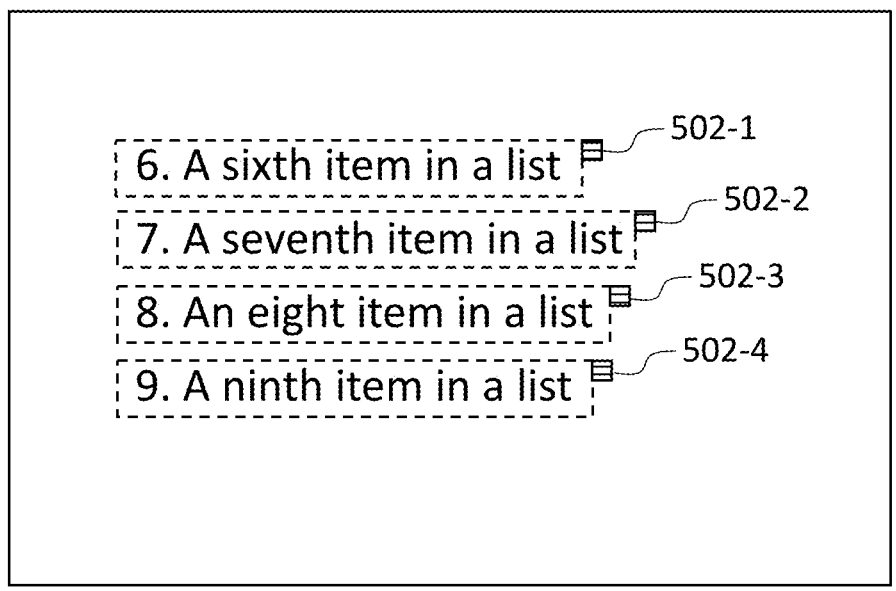
FIG. 5B illustrates the corrected classification for the document structural element, according to some embodiments.

FIG. 5B illustrates the same series of list items from FIG. 5A, but with the correct classification provided for each of the identified structures due to the post-processing operations performed by Correction Module 126, according to an embodiment. Each of the text-based structural elements has been correctly classified as having a list item classification 502-1 to 502-4.

Figure 6A:
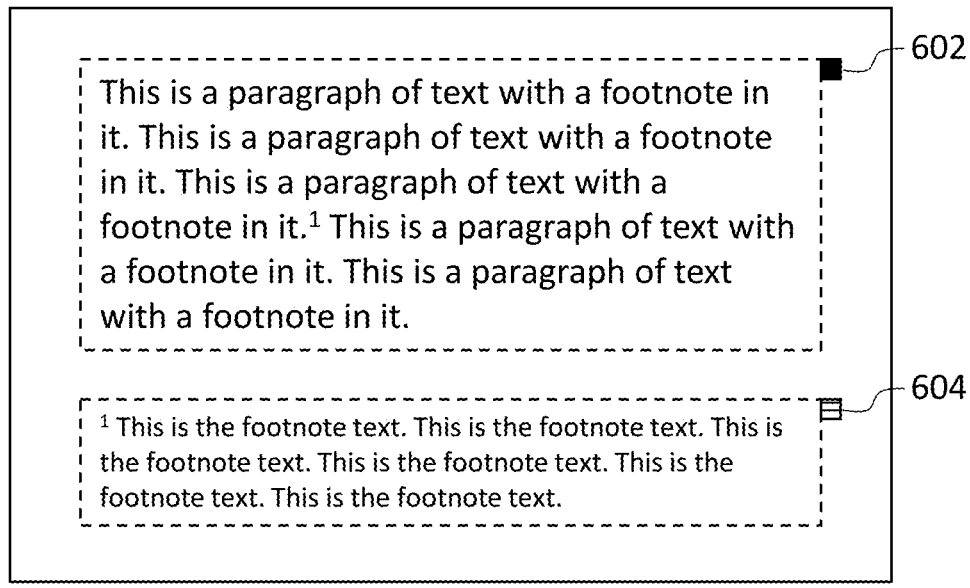
FIG. 6A illustrates a second example error for a document structural element.

FIG. 6A illustrates an example of a misclassified structural element that is not part of a list of similar structural elements. In this example, the footnote text has been mischaracterized as having a list element classification 604 instead of the correct footnote classification beneath a block of text given a body text classification 602. This is an example of a classification error. Note that in this example, the instance bounds of each structural element are correct.

According to an embodiment, the classification error is corrected using adjacent document content. In this example, there was likely ambiguity in the ML model output between whether the footnote text should be classified as "list item" or "footnote" (or possibly even "body text"). When such ambiguities occur, various operations can be performed involving the adjacent document content to determine which classification is correct. For example, context from the adjacent text can be observed to identify if a footnote classification should be used instead. This may involve comparing the font properties and relative locations of the footnote text and adjacent document text to determine that the footnote text is smaller and below the adjacent document text (indicating that a footnote classification is likely valid). In another example, the adjacent font in the document can be searched for matching symbols (such as the superscript footnote symbol), indicating that the footnote text should be classified as a footnote.

Figure 6B:
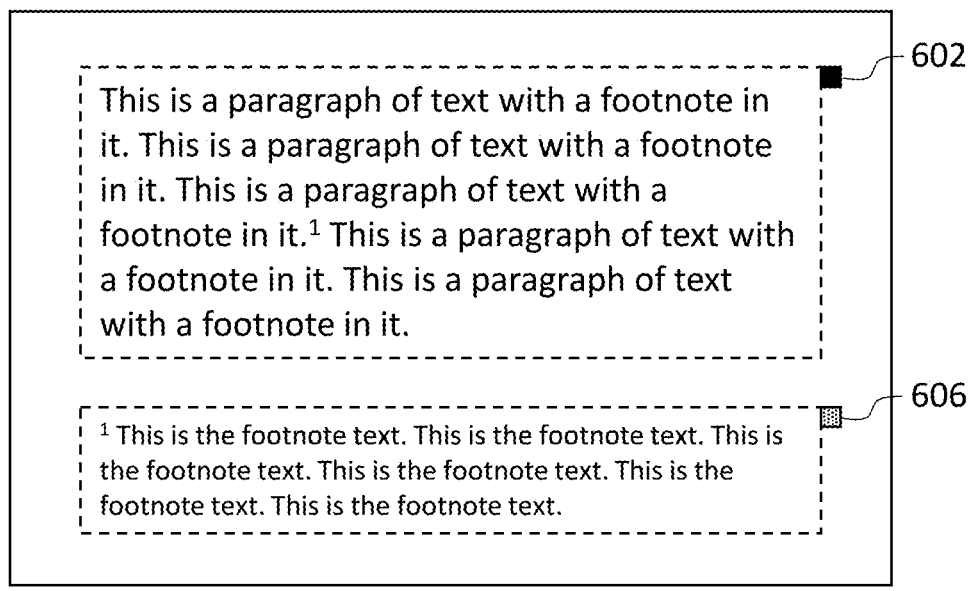
FIG. 6B illustrates the corrected classification for the document structural element, according to some embodiments.

FIG. 6B illustrates the same structural elements from FIG. 6A, but with the correct classification provided for each of the identified structures due to the post-processing operations performed by Correction Module 126, according to an embodiment. The text structural element beneath the body text has now been correctly provided a footnote classification 606.

In one example embodiment, each of the identified structural elements on a given page can be filtered to include only those that include a bullet or other similar list identifier (such as numbering) to disambiguate between text, list item, and footnote classifications for each of the filtered structural elements. Afterwards, the filtered list of structural elements can be sub-divided based on font properties (e.g., portions of the list having similar font size or style may be grouped together.) Then, for each sub-divided list, the dominant classification is determined. A classification may be considered the dominant classification if at least 50%, 60%, 70%, 80%, or 90% of the structural elements in the sub-divided list have the same classification. If all of the items in a given sub-divided list have the same classification, then there is likely no classification error for any of the structural elements in the sub-divided list. However, if one or more of the items in the sub-divided list have a different classification than the dominant classification, these items may be tagged as having an erroneous classification. The tagged items can then have their classification changed to match the dominant classification from their particular sub-divided list. In cases where only one structural element is present in a given sub-divided list, this may be an indication that the single structural element should be a footnote. If it is not already classified as a footnote, then a series of checks may be performed to determine if the classification should be changed to footnote. These series of checks can include comparing the bullet associated with the one structural element to any superscript references on the page, comparing the alignment of the bullet with other footnote structures, determining if the one structural element was given a footnote confidence score above a threshold value, or comparing font properties of the one structural element with font properties of one or more adjacent structural elements.

Figure 7A:
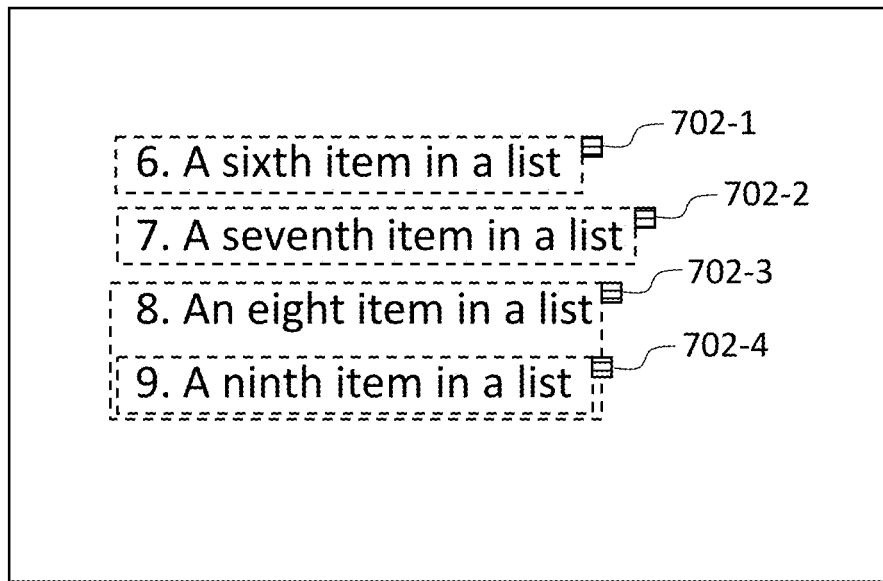
FIG. 7A illustrates a third example error for a document structural element.

FIG. 7A illustrates another example of a series of list items where the instance bounds of one of the list items erroneously extends to overlap an adjacent list item. In this example, list item classification 702-3 has instance bounds that also envelop list item classification 702-4. If such a situation is not corrected, then the overlapped classification (702-4 in this example) may be deleted. This is an example of an instance boundary error as it pertains to incorrect placement of the instance bounds. Note that in this example, the identified classifications of each structural element are correct.

According to an embodiment, the instance boundary error is corrected using adjacent document content. For example, a pattern from the adjacent text can be observed to identify the use of sequential numbers (e.g., 6, 7, 8, 9), thus raising the probability that each of the list items related to each of the sequential numbers should be its own separate structural element. This may then be compared to the current situation which has a structural element classified as a list item 702-3 that encompasses two of the sequential numbers (8 and 9 in this example). This information strongly suggests that the list item classification 702-3 should have instance bounds that only encompass that particular text structure and not the adjacent text structure having the same classification. In another example, a pattern of repeated use of particular graphics or glyphs (such as bullet points) can be used to determine that each structural element having its own graphic or glyph should be a separately classified element.

It should be understood that structural elements with overlapping instance bounds does not always indicate an error. Indeed, electronic documents may include situations where separate structural elements are inset into other structural elements. For example, a small list of items or a small figure may be included as an aside within a block of body text. In such examples, the aside structural element would be included within the instance bounds of the body text and would have its own instance bounds to separately identify its classification. Certain checks can be performed by Correction Module 126 using document content to determine if the overlapping instance bounds are intended. These may include comparing the font properties of the structural elements (the more different the font types, the more likely the overlapping instance bounds is intended.) Other checks may include calculating gap distances between the instance bounds of the inset structural element and the surrounding content within the greater structural element. Clear, defined gaps in all directions, or gap distances without a given threshold, may indicate that the overlapping instance bounds is intended. In another example, a figure/table caption for an inset table or figure may be included within the instance bounds of surrounding text. A check for an adjacent figure or table to the figure/table caption can be performed to determine that the overlapping instance bounds are intended.

Figure 7B:
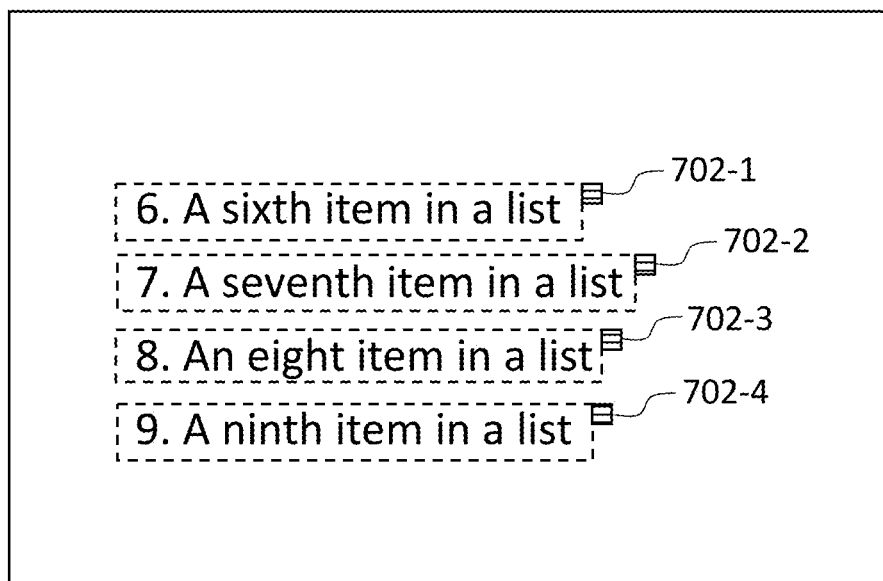
FIG. 7B illustrates the corrected classification for the document structural element, according to some embodiments.

FIG. 7B illustrates the same series of list items from FIG. 7A, but with the correct instance bounds provided for each of the identified structures due to the post-processing operations performed by Correction Module 126, according to an embodiment. Each of list items classifications 702-1 to 702-4 correctly includes instance bounds that separately defines each text structure of the list.

Figure 8A:
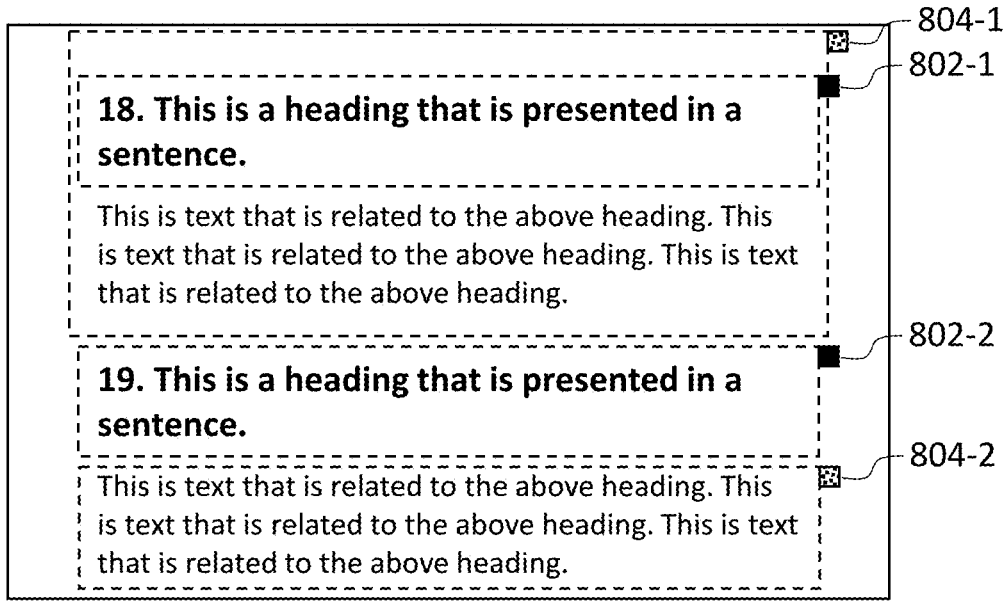
FIG. 8A illustrates a fourth example error for a document structural element.

FIG. 8A illustrates another example of structural elements where the instance bounds associated with one of the structural elements erroneously extends to overlap an adjacent structural element. In this example, heading classifications 802-1 and 802-2 have been correctly identified with correct instance bounds. But the instance bounds of the body text classification 804-1 overlaps with heading classification 802-1. If such a situation is not corrected, then the overlapped classification (802-1 in this example) may be deleted. This is an example of both an instance boundary error and a classification error as it pertains to incorrect placement of the instance bounds and also misclassifying the heading text as potentially being body text (if heading classification 802-1 were to be deleted).

According to an embodiment, the errors are corrected using adjacent document content. For example, context from the adjacent text can be observed to identify if the heading classification 802-1 should remain, thus lowering the instance bounds on body text classification 804-1 to below heading classification 802-1. For example, the font properties can be compared between the heading text and the adjacent body text. Properties such as font size, bolding, using all caps, and underlining, to name a few examples, can be used to distinguish a heading structure from a body text structure. In some embodiments, other similar structural relationships on the same page can be observed and matched to correct the identification. For example, heading classification 802-2 and body text classification 804-2 are correctly identified with correct instance bounds. This correct instance bound placement may be mapped up onto heading classification 802-1 and body text classification 804-1 by observing the similarities between the structures and their properties (e.g., distance from one another, font properties, etc.) In some examples, the relative location between the heading text and the adjacent body text can be used to observe that the heading text is located directly above the body text. This can provide an indication that heading classification 802-1 should remain.

Figure 8B:
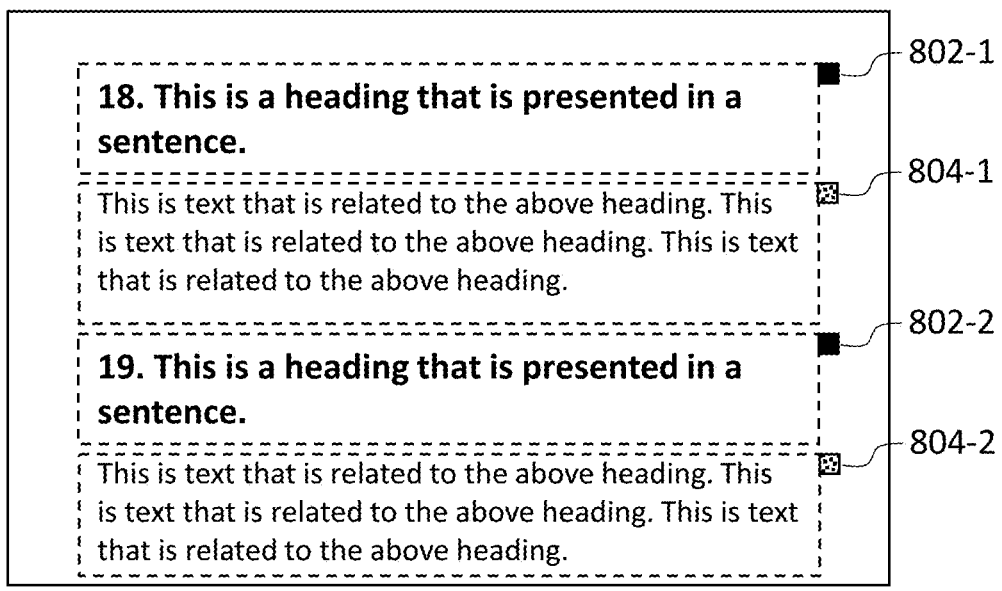
FIG. 8B illustrates the corrected classification for the document structural element, according to some embodiments.

FIG. 8B illustrates the same structural elements from FIG. 8A, but with the correct instance bounds provided for each of the identified structures due to the post-processing operations performed by Correction Module 126, according to an embodiment. The relationship between heading classification 802-1 and body text classification 804-1 now matches the relationship between heading classification 802-2 and body text classification 804-2.

Figure 9A:
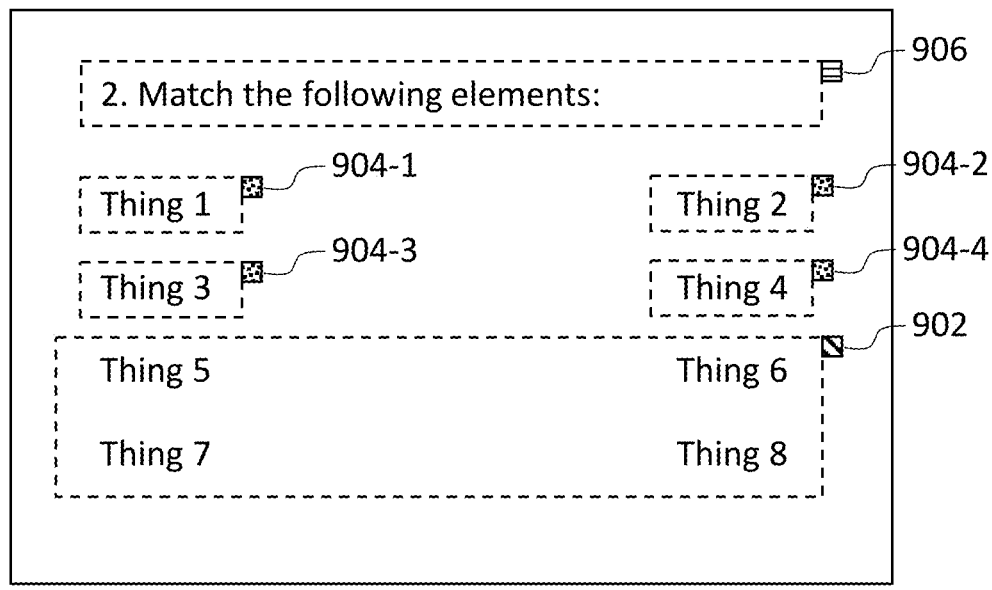
FIG. 9A illustrates a fifth example error for some document structural elements.

FIG. 9A illustrates an example of structural elements where the instance bounds associated a particular structural element fails to envelop certain text elements on the page that should be part of the particular structural element. Furthermore, the other text elements have been erroneously classified as being separate structural elements. In this example, the instance bounds of table classification 906 fail to include other text items that should be part of the table. Additionally, the other text items have been erroneously provided body text classifications 904-1-904-4. This is an example of both an instance boundary error and a classification error as it pertains to incorrect placement of the instance bounds and also misclassifying some of the text as being body text. A heading classification 906 has been correctly applied to the top structural element.

According to an embodiment, the errors are corrected using adjacent document content. For example, patterns from the locations of the adjacent text can be observed to identify a columnar structure of the text components 'Thing 1'-'Thing 8.' This identified columnar structure can be used to correct the instance bounds for the table classification 902 to include each of the text elements that adhere to the columnar structure. This may also remove the previous body text classifications 904-1-904-4 provided to the text elements. In another example, gap spacing between different text elements may be used to identify consistent spacing between the text components 'Thing 1'-'Thing 8' leading to a decision that the text components should all belong to the same table classification.

In some embodiments, the instance bounds associated with table classification 902 can iteratively expand for each new line of text that includes structural elements which fit the spacing and alignment of the other structural elements already within the instance bounds. For example, if the instance bounds for table classification 902 are surrounding the text structures 'Thing 5'-'Thing 8', 'Thing 3' and 'Thing 4' would be considered for inclusion within the instance bounds for table classification 902 as they are adjacent text. The text structures 'Thing 3' and 'Thing 4' may be deemed to be elements of the table because they have the same alignment on the page along with 'Thing 5'-'Thing 8', and/or have a spacing between themselves and the adjacent Thing 5 and Thing 6 elements that is consistent with the spacing between the other text structures of the table. The same process can then be repeated for 'Thing 1' and 'Thing 2' to determine that they should also be included within the table.

Figure 9B:
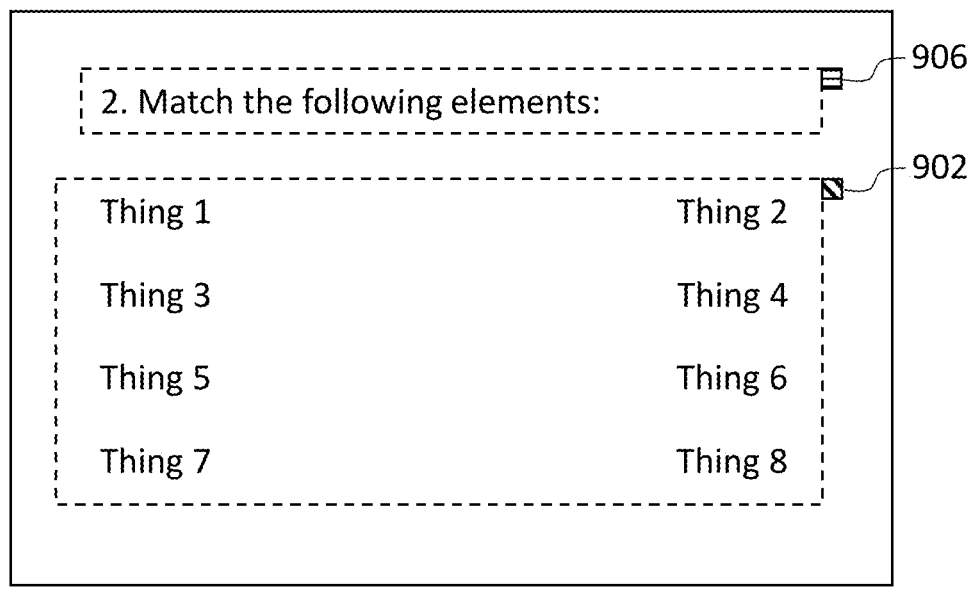
FIG. 9B illustrates the corrected classifications for the document structural elements, according to some embodiments.

FIG. 9B illustrates the same structural elements from FIG. 9A, but with the correct instance bounds provided for table classification 902 due to the post-processing operations performed by Correction Module 126, according to an embodiment. The erroneous classifications previously provided for certain text elements within table classification 902 have also been removed.

Figure 10A:
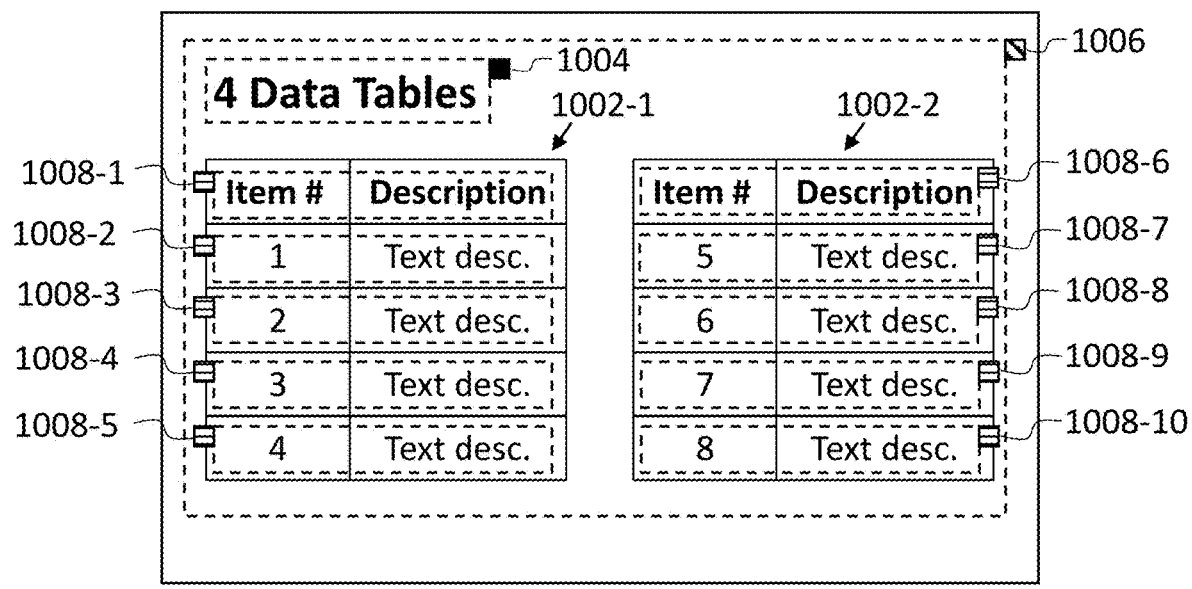
FIG. 10A illustrates a sixth example error for some document structural elements.

In some instances, complex structures within an electronic document such as graphical tables with various fonts can cause significant confusion for the ML model leading to highly erroneous outputs. FIG. 10A illustrates an example having a first table 1002-1 and a second table 1002-2 provided on a page beneath a heading with a correct heading classification 1004. However, the presence of tables 1002-1 and 1002-2 have led to a variety of erroneous classifications and incorrect instance bounds by the ML model. In this specific example, all structures have been provided a table classification 1006 while individual text elements within each of the tables are provided separate list item classifications 1008-1-1008-10. This is an example of both an instance boundary error and a classification error as it pertains to incorrect placement of the table instance bounds and also misclassifying elements of the table as being list items.

Figure 10B:
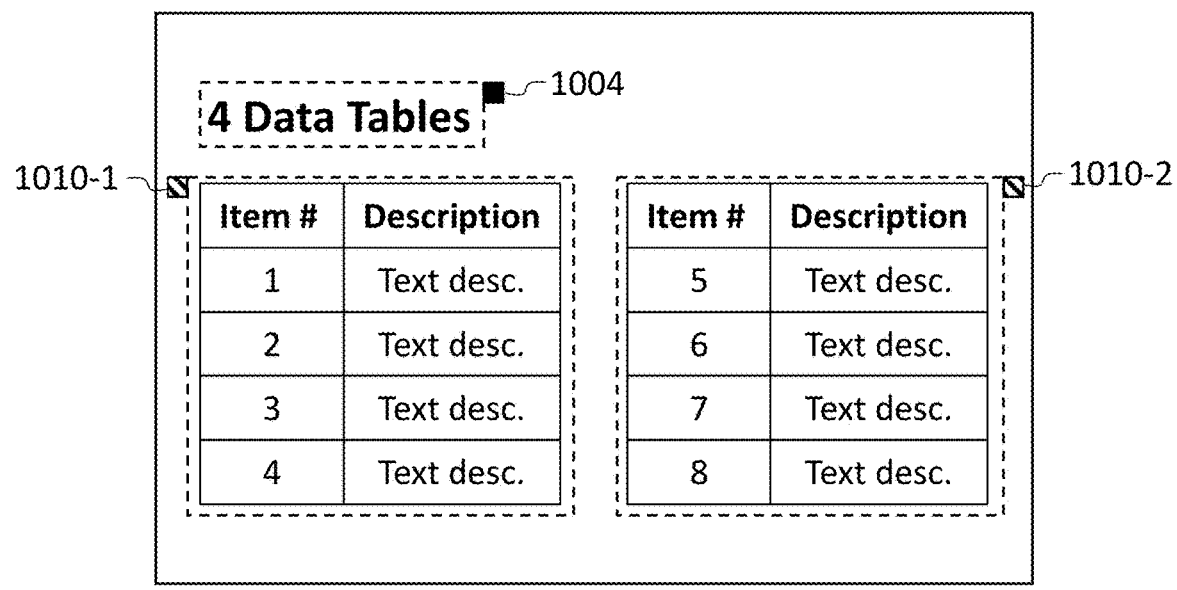
FIG. 10B illustrates the corrected classifications for the document structural elements, according to some embodiments.

According to an embodiment, the errors are corrected using adjacent document content. For example, graphical patterns, such as line graphics, on the page can be used to distinguish the bounds of each of tables 1002-1 and 1002-2. These graphical patterns include the borders and bars used to draw the tables, according to some embodiments. Spacing between adjacent structures can also be observed to determine that two separate tables exist (rather than one large table). By relying on the surrounding document content, or the surrounding document content in combination with the instance bounds predictions made by ML model 106, using the post-processing operations performed by Correction Module 126, the instance bounds for table classification 1006 are reduced to encompass each individual table and split into table classification 1010-1 and table classification 1010-2, as illustrated in FIG. 10B, according to an embodiment.

In one example, rich information from the document can be used to determine the presence of the line graphics (e.g., orthogonal lines making up the various cells of table 1002-1 and table 1002-2), and these line graphics can all be bound within one or more table bounding boxes. Next, a check is made to determine if multiple tables actually exist within the predicated instance bounds of the table classification. If the fraction of uncovered content space within the predicted instance bounds for the table classification is greater than a threshold amount, then multiple tables exist, and the instance bounds of the table classification are split into multiple table classifications to match the multiple table bounding boxes. In the illustrated example of FIG. 10B, the instance bounds for table classification 1006 are split into table classification 1010-1 and table classification 1010-2 to match the table bounding boxes of first table 1002-1 and second table 1002-2.

Figure 11A:
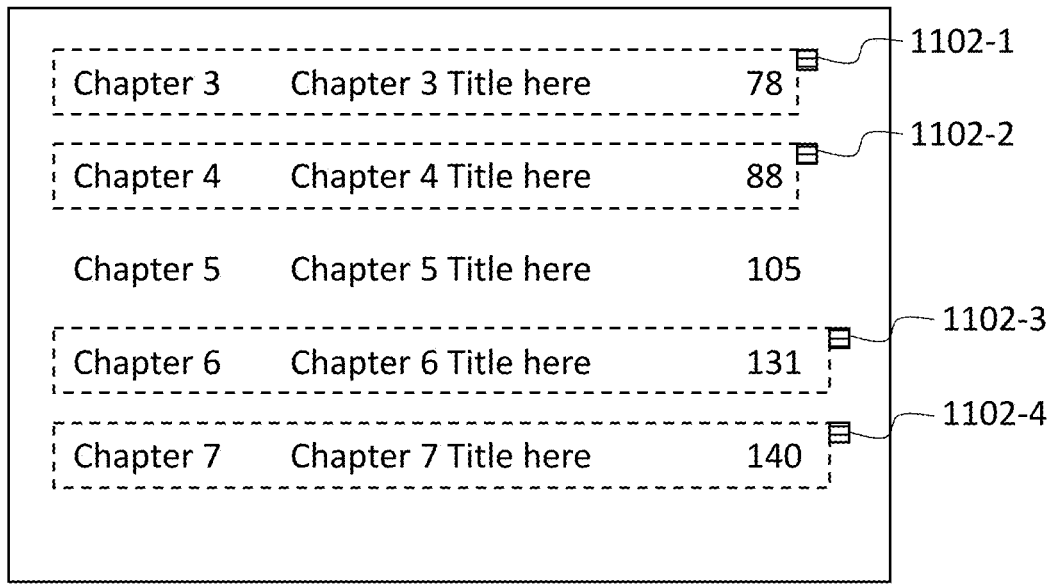
FIG. 11A illustrates a seventh example error for a document structural element.

FIG. 11A illustrates an example of a series of list items having an unclassified member in the list. In this example, list item classifications 1102-1 to 1102-4 have been correctly classified, but the text line for 'Chapter 5' was not classified. If this error is not corrected, then this text would not be included in the generated structural map, which may lead to the text not being displayed properly when the electronic document is reformatted for a particular screen. This is an example of a data loss error. Note that in this example, the instance bounds and classification of each of the adjacent structural elements are correct. The unclassified text structure is identified using the rich information from the document. That is, the various text structures 'Chapter 5,' 'Chapter 5 Title here,' and '105' are all identified in the document as being structural elements, but they have received no classification from ML model 106.

According to an embodiment, the data loss error is corrected using adjacent document content. For example, a pattern from the adjacent text can be observed to identify a series of classified list items before (1102-1 and 1102-2) and after (1102-3 and 1102-4) the unclassified structural element. This information strongly suggests that the unclassified structural element is also a list item from the same list. Furthermore, the similarities in both the horizontal and vertical alignment between the unclassified text structures and the adjacent classified text structures strongly suggest that the unclassified text structures should be classified using the same format as list item classifications 1102-1 to 1102-4. In another example, a pattern of repeated use of particular graphics or glyphs (such as bullet points) can be used to determine that the given unclassified structural element should be a "list item." In yet another example, the arrangement and spacing between the adjacent structural elements can be used to identify that each of the similarly arranged and spaced structures are part of the same list. Font properties may be used as well to determine similarities between adjacent structural elements, such as determining that the unclassified text structures use the same font size and style as each of the adjacent classified text structures.

Figure 11B:
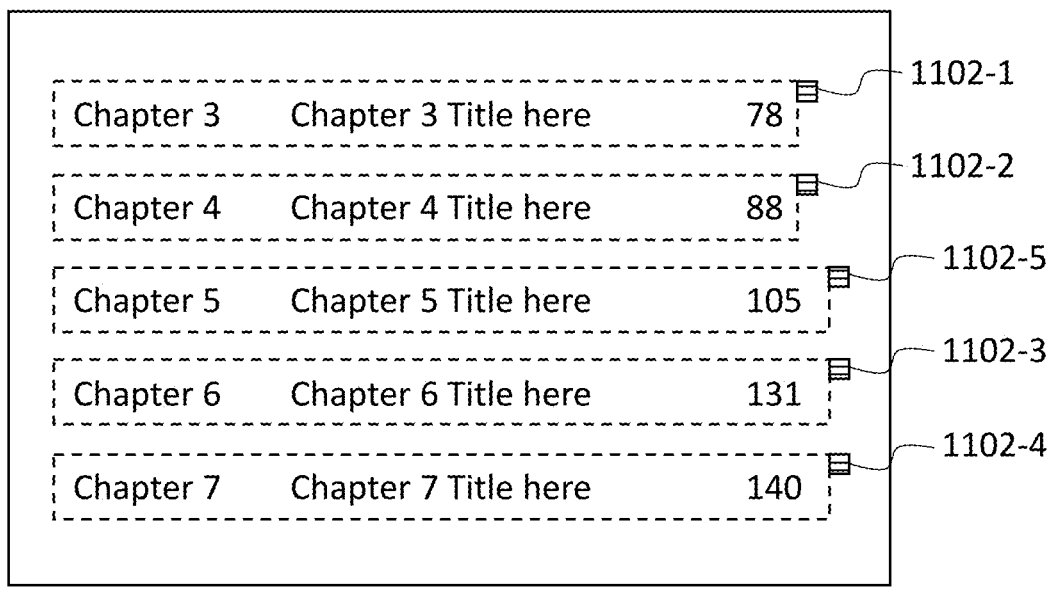
FIG. 11B illustrates the corrected classification for the document structural element, according to some embodiments.

FIG. 11B illustrates the same series of list items from FIG. 11A, but with the correct classification provided for each of the identified structures due to the post-processing operations performed by Correction Module 126, according to an embodiment. Each of the text-based structural elements has been correctly classified as having a list item classification 1102-1 to 1102-5, with 1102-5 being added to address the previously unclassified structural element.

Figure 12A:
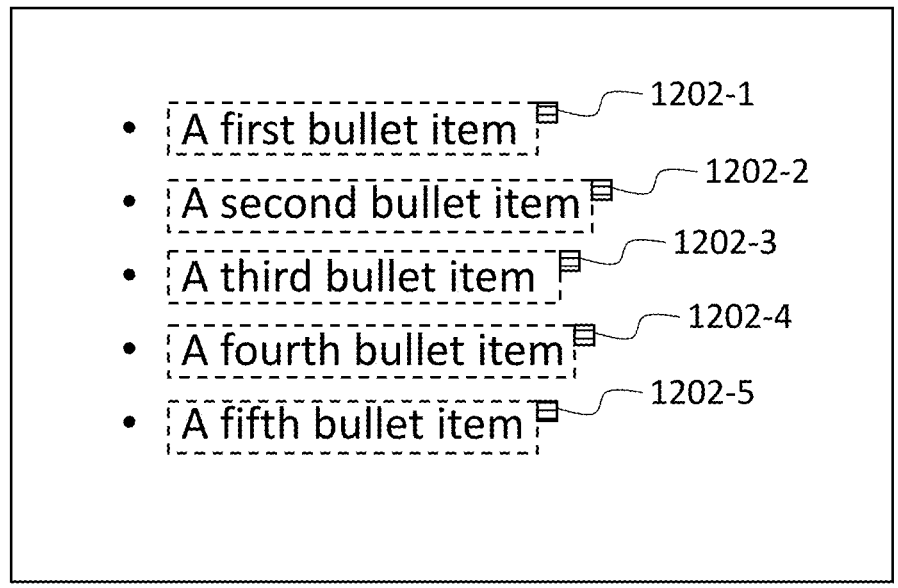
FIG. 12A illustrates an eighth example error for some document structural elements.

FIG. 12A illustrates another example of a series of list items having unclassified content in the list. In this example, list item classifications 1202-1 to 1202-5 have been correctly classified, but the instance bounds for the classifications fail to encompass the associated bullet points. If this error is not corrected, then these bullet points would not be included in the generated structural map, which may lead to the bullet points not being displayed properly when the electronic document is reformatted for a particular screen. This is an example of a data loss error (as the bullet points are unclassified) and also an instance boundary error as the instance bounds are not correct. Note that in this example, the classification of each of the structural elements is correct.

According to an embodiment, the data loss and instance boundary errors are corrected using adjacent document content. For example, a pattern of repeated use of particular graphics or glyphs (such as the bullet points) adjacent to each of the classified list items strongly suggests that the particular graphics or glyphs should be included within each of the classified list items. In yet another example, the arrangement and spacing between the classified structural elements and the unclassified graphics or glyphs can be used to identify consistent spacing between the graphics or glyphs and the classified structural elements as well as between the graphics or glyphs themselves.

Figure 12B:
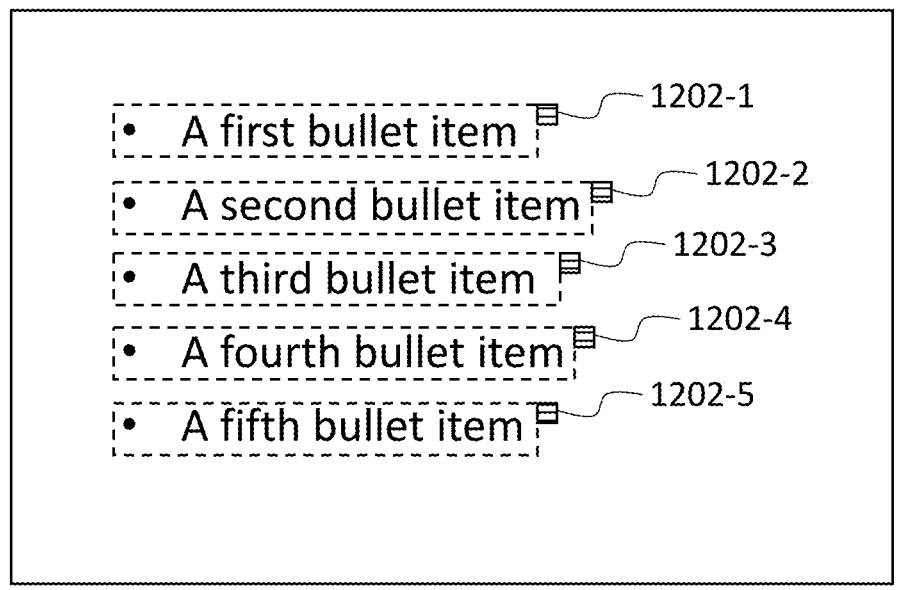
FIG. 12B illustrates the corrected classifications for the document structural elements, according to some embodiments.

FIG. 12B illustrates the same series of list items from FIG. 12A, but with the correct instance bounds that includes the bullet points for each of the classified list item structures due to the post-processing operations performed by Correction Module 126, according to an embodiment.

Methodology for Document Structural Elements Detection and Correction

Figure 13:
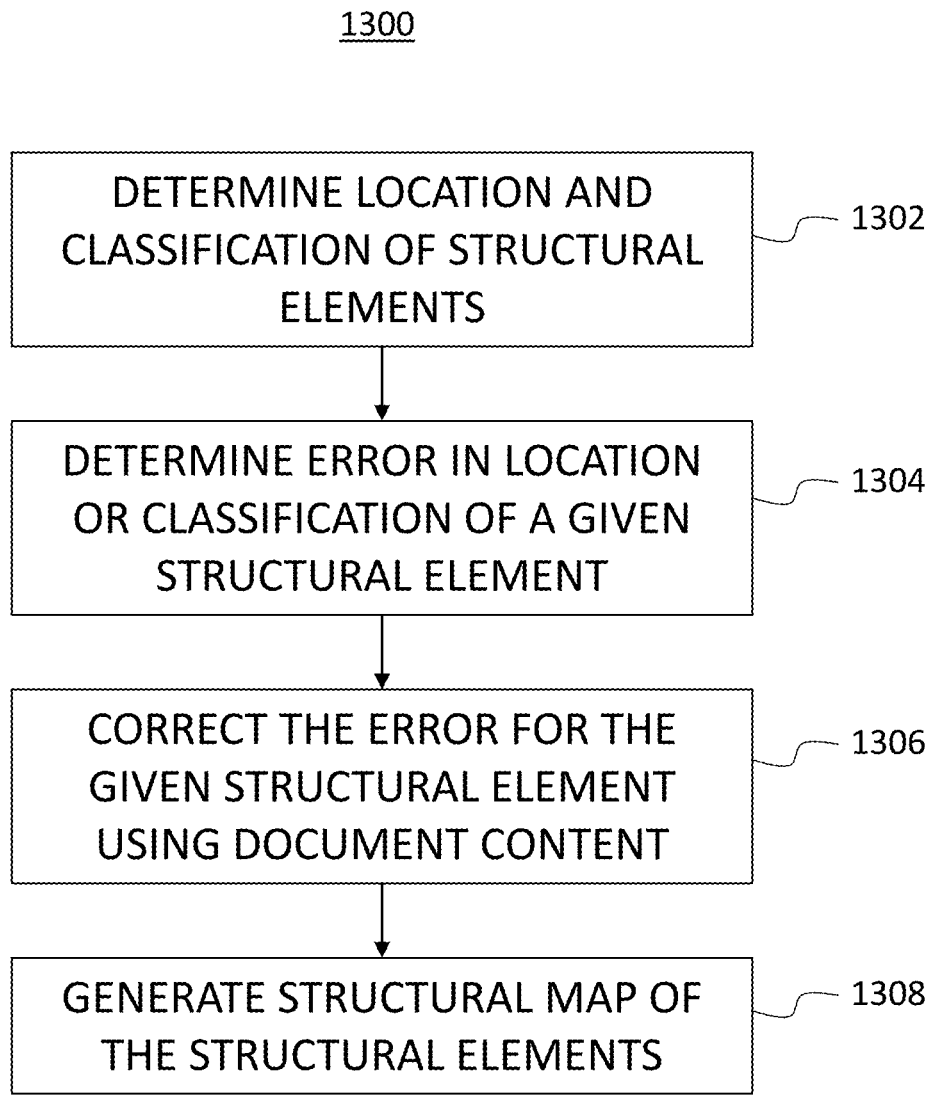
FIG. 13 is a flow diagram of an example method for identifying the location and classification of structural elements in an electronic document, in accordance with an embodiment of the present disclosure.

FIG. 13 is a flow diagram of an example method 1300 for detecting structural elements of an electronic document and correcting errors using document content information, in accordance with an embodiment. Method 1300 may be performed, for example, in whole or in part by Structure Detection Module 124, Correction Module 126, Document Structure Detection Application 118, or any combination of these, such as described with respect to FIG. 1. The operations, functions, or actions described in the respective blocks of example method 1300 may also be stored as computer-executable instructions in a non-transitory computer-readable medium, such as a memory and/or a data storage of a computing system. As will be further appreciated in light of this disclosure, for this and other processes and methods disclosed herein, the functions performed in method 1300 may be implemented in a differing order. Additionally, or alternatively, two or more operations may be performed at the same time or otherwise in an overlapping contemporaneous fashion.

Method 1300 begins with operation 1302 where the location and classification of one or more structural elements are determined on a given page of an electronic document. The determinations may be made using a ML model that has been trained to identify a variety of structural element classifications. Document structural elements can refer to any text or figure features in the document. For example, classifications of document structural elements can include headings, list items, body text, footnotes, figures, and tables, to name a few examples. Furthermore, locations of the various structural elements are identified using instance bounds that determine the area of the given page that is taken up by each associated structural element.

Method 1300 continues with operation 1304 where one or more errors are determined in the classification, location, or both for a given structural element. Errors may be determined for any number of structural elements on the given page of the electronic document. A possible error may exist if the confidence metric for a selected classification for the given structural element is below a threshold value, and/or if multiple classifications are determined to be possible for the given structural element. Additionally, errors may exist with the instance bounds of the given structural element or for any adjacent structural elements having overlapping instance bounds. Other possible errors include structural elements that are not classified at all.

Method 1300 continues with operation 1306 where the one or more errors are corrected for the given structural element using adjacent document content. The adjacent document content can include other structural elements or page graphics. In some embodiments, the classification or location of the adjacent structural elements can be used to determine how to correct the one or more errors associated with the given structural element. In some embodiments, a misclassified structural element is corrected by analyzing a pattern of spatially adjacent structural elements on the page with each having the correct classification. In some embodiments, a misclassified structural element is corrected by analyzing a context of the misclassified structural element compared to a context of one or more adjacent structural elements on the page. In some embodiments, the instance bounds for a given classification associated with one or more of the structural elements is corrected to include adjacent structural elements, or to exclude adjacent structural elements. In some embodiments, unclassified structural elements are classified by analyzing a pattern of spatially adjacent structural elements on the page with each having the given classification. In some embodiments, unclassified structural elements are classified with a given classification by extending adjacent instance bounds associated with the given classification to include the unclassified one or more structural elements. Any number of corrections may be applied to the classification and/or location of a single structural element, or across multiple structural elements.

Method 1300 continues with operation 1308, which includes generating a structural map of the structural elements on the given page of the electronic document. The structural map provides an organized listing of each of the classified structural elements and their locations (determined by their associated instance bounds) on a given page of the electronic document. In some embodiments, a different structural map is generated for each page of the electronic document. The structural map may be used to automatically generate a table of contents or a table of figures for the electronic document. More generally, the location and/or classification of the structural elements provided in the structural map can be used by a user to quickly navigate through the electronic document by jumping to various portions of the document based on a desired structural element type. In some embodiments, the structural map of each page of the electronic document can be used to determine a different display scheme for each page of the electronic document.

Figure 14:
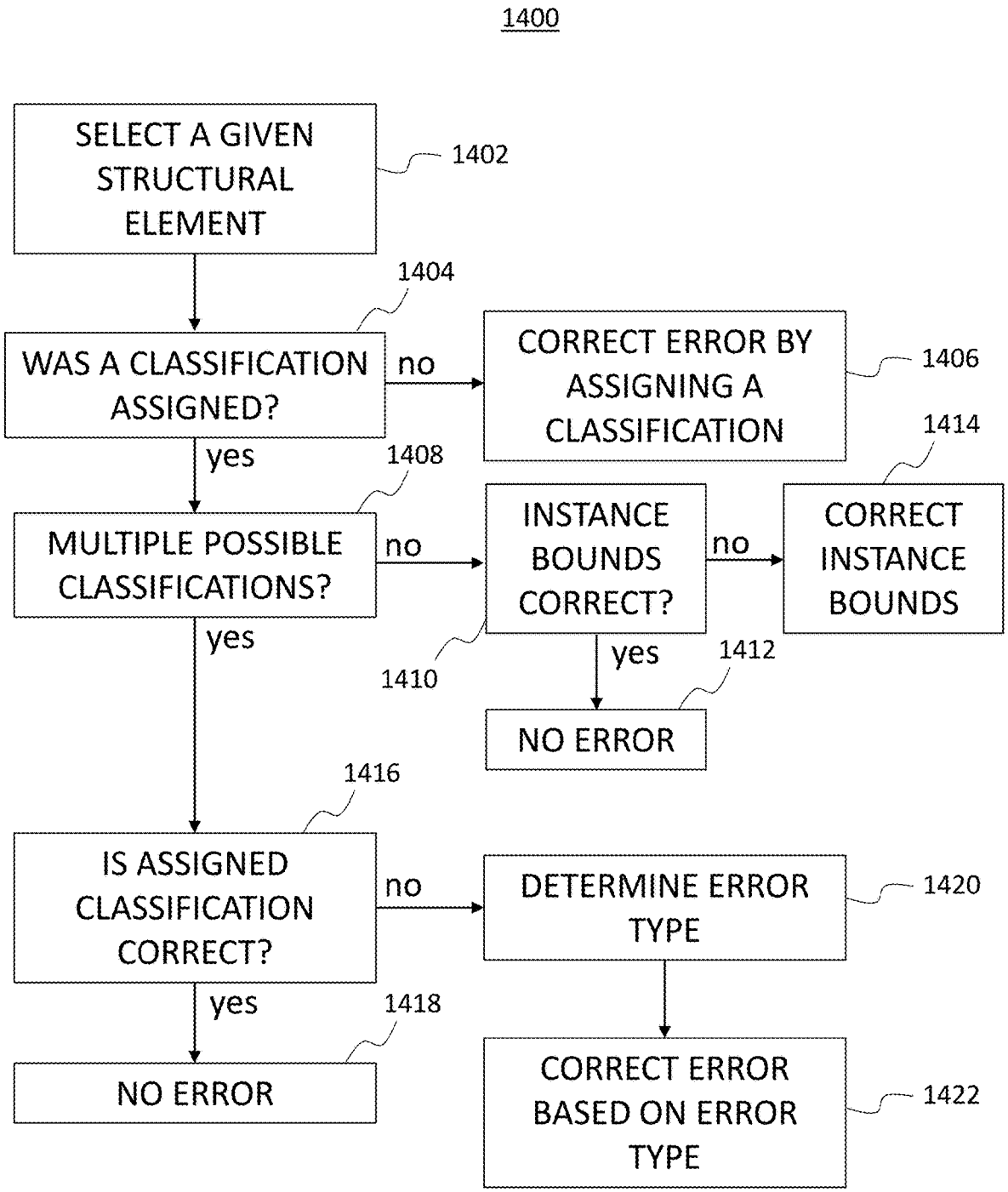
FIG. 14 is a flow diagram of an example method for correcting an error in the location or classification of a given structural element, in accordance with an embodiment of the present disclosure.

FIG. 14 is a flow diagram of an example method 1400 for identifying and correcting errors in the classification and/or location assigned to one or more structural elements of an electronic document, in accordance with an embodiment. Method 1400 may be performed, for example, in whole or in part by Correction Module 126, Document Structure Detection Application 118, or any combination of these, such as described with respect to FIG. 1. The operations, functions, or actions described in the respective blocks of example method 1400 may also be stored as computer-executable instructions in a non-transitory computer-readable medium, such as a memory and/or a data storage of a computing system. As will be further appreciated in light of this disclosure, for this and other processes and methods disclosed herein, the functions performed in method 1400 may be implemented in a differing order. Additionally, or alternatively, two or more operations may be performed at the same time or otherwise in an overlapping contemporaneous fashion. It should also be understood that method 1400 may be iterated until each structural element on a given page of the electronic document has been covered.

Method 1400 begins with operation 1402 where a structural element is selected to determine if an error is present with regards to the classification or location of the selected structural element. In some embodiments, a group of structural elements is selected to determine if errors are present within the group. Structural elements may be sequentially selected in any order on a given page of the electronic document.

Method 1400 continues with operation 1404 where a check is made to determine if a classification has been assigned to the selected structural element. If no classification has been assigned, method 1400 proceeds to operation 1406 where the data loss error is corrected by assigning a classification to the structural element.

If a classification has been assigned to the structural element, then method 1400 proceeds to operation 1408 where another check is made to determine if the selected structural element had multiple possible classifications. Multiple classifications could be determined possible by the ML model when attempting to classify a given structural element. A classification with a highest confidence metric may be chosen as the one to use as discussed above. If only one classification was determined for the selected structural element (e.g., a classification with a confidence metric of 100%), then method 1400 continues to operation 1410, otherwise the method continues to operation 1416.

At operation 1410, a check is made to determine if the instance bounds of the selected structural element are correct. The instance bounds may be found erroneous if they encompass other structural elements or if they fail to encompass all portions of the selected structural element. If the instance bounds are correct, then method 1400 continues to operation 1412 where it is determined that there is no error associated with the selected structural element. If the instance bounds are not correct, then method 1400 continues to operation 1414 where the instance bounds are corrected using any of the correction techniques discussed herein.

At operation 1416, another check is made to determine if the assigned classification for the selected structural element is correct. This may be performed using any of the techniques discussed herein that make use of patterns or context of adjacent document content to determine if the assigned classification is correct. Operation 1416 also involves determining if the instance bounds of the selected structural element are correct, according to some embodiments. If the assigned classification (and/or instance bounds) is determined to be correct, then method 1400 proceeds to operation 1418 where it is determined that there is no error associated with the selected structural element. Otherwise, method 1400 proceeds to operation 1420.

At operation 1420, the error type is determined and subsequently corrected at operation 1422. The error type may be one or more of a classification error, instance boundary error, or data loss error. The errors may be corrected using any one or more of the various techniques discussed herein. Operations 1420 and 1422 may be iterated any number of times to correct more than one error associated with the given structural element.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for identifying structural elements of a document. The method includes determining location and classification for each of one or more structural elements on a page of the document using a machine learning (ML) model; determining one or more errors in the location or classification for at least one of the one or more structural elements; correcting each instance of the one or more errors for a corresponding structural element using document content spatially adjacent to the corresponding structural element on the page of the document, thereby generating a corrected set of one or more locations and one or more classifications; and generating a structural map of the page of the document based on the corrected one or more locations and one or more classifications.

Example 2 includes the subject matter of Example 1, further comprising determining a display scheme for the page of the document based on the generated structural map of the page and causing display of the page of the document using the display scheme.

Example 3 includes the subject matter of Example 1 or 2, wherein determining the location and classification for each of the one or more structural elements comprises determining one or more possible classifications for each of the one or more structural elements, wherein each of the one or more possible classifications includes a corresponding confidence metric.

Example 4 includes the subject matter of Example 3, wherein determining the location and classification for each of the one or more structural elements comprises selecting the classification having the highest confidence metric.

Example 5 includes the subject matter of Example 3, wherein determining the one or more errors occurs in response to the at least one of the one or more structural elements having at least two possible classifications.

Example 6 includes the subject matter of any one of Examples 1-5, wherein correcting each instance of the one or more errors comprises correcting a misclassification of a structural element by analyzing a pattern of spatially adjacent structural elements on the page with each having the correct classification.

Example 7 includes the subject matter of any one of Examples 1-6, wherein correcting each instance of the one or more errors comprises correcting a misclassification of a structural element by analyzing a context of the misclassified structural element compared to a context of one or more adjacent structural elements on the page.

Example 8 includes the subject matter of any one of Examples 1-7, wherein determining the one or more errors comprises determining that instance bounds of a first classification overlaps with instance bounds of a second classification.

Example 9 includes the subject matter of any one of Examples 1-8, wherein correcting each instance of the one or more errors comprises correcting a location of instance bounds for a given classification associated with one of the one or more structural elements to include adjacent structural elements.

Example 10 includes the subject matter of any one of Examples 1-9, wherein correcting each instance of the one or more errors comprises correcting a location of instance bounds for a given classification associated with one of the one or more structural elements to exclude an adjacent structural element having a same associated classification.

Example 11 includes the subject matter of any one of Examples 1-10, wherein correcting each instance of the one or more errors comprises correcting a location of instance bounds for a given classification using a line graphic present on the page.

Example 12 includes the subject matter of any one of Examples 1-11, wherein determining the one or more errors comprises determining the existence of one or more structural elements on the page that are unclassified.

Example 13 includes the subject matter of Example 12, wherein correcting each instance of the one or more errors comprises classifying the unclassified one or more structural elements with a given classification by analyzing a pattern of spatially adjacent structural elements on the page, each of the spatially adjacent structural elements having the given classification.

Example 14 includes the subject matter of Example 12, wherein correcting each instance of the one or more errors comprises classifying the unclassified one or more structural elements with a given classification by extending one or more adjacent instance bounds associated with the given classification to include the unclassified one or more structural elements.

Example 15 is a system configured to identify structural elements of a document. The system includes at least one processor, and a storage medium operatively coupled to the at least one processor and configured to store instructions that when executed by the at least one processor cause the at least one processor to perform operations comprising determining location and classification for each of a plurality of structural elements on a page of the document using a machine learning (ML) model, determining one or more errors in the location or classification for at least one of the plurality of structural elements, correcting each instance of the one or more errors for a corresponding structural element using document content spatially adjacent to the corresponding structural element on the page of the document, thereby generating a corrected set of one or more locations and one or more classifications, and generating a structural map of the page of the document based on the corrected set of one or more locations and one or more classifications.

Example 16 includes the subject matter of Example 15, further comprising a display, wherein the operations further comprise determining a display scheme for the page of the document based on the generated structural map of the page and displaying the page of the document using the display scheme on the display.

Example 17 includes the subject matter of Example 15 or 16, wherein the operations comprise determining one or more possible classifications for each of the plurality of structural elements, wherein each of the one or more possible classifications includes a corresponding confidence metric.

Example 18 includes the subject matter of Example 17, wherein the operations comprise selecting the classification having the highest confidence metric.

Example 19 includes the subject matter of Example 17, wherein the operations comprise determining the one or more errors in response to the at least one of the plurality of structural elements having at least two possible classifications.

Example 20 includes the subject matter of any one of Examples 15-19, wherein the operations comprise correcting a misclassification of a structural element by analyzing a pattern of spatially adjacent structural elements on the page each having the correct classification.

Example 21 includes the subject matter of any one of Examples 15-20, wherein the operations comprise correcting a misclassification of a structural element by analyzing a context of the misclassified structural element compared to a context of one or more adjacent structural elements on the page.

Example 22 includes the subject matter of any one of Examples 15-21, wherein the operations comprise determining that instance bounds of a first classification overlaps with instance bounds of a second classification.

Example 23 includes the subject matter of any one of Examples 15-22, wherein the operations comprise correcting a location of instance bounds for a given classification associated with one or more of the structural elements to include adjacent structural elements.

Example 24 includes the subject matter of any one of Examples 15-23, wherein the operations comprise correcting a location of instance bounds for a given classification associated with one or more of the structural elements to exclude adjacent structural elements having a same associated classification.

Example 25 includes the subject matter of any one of Examples 15-24, wherein the operations comprise correcting a location of instance bounds for a given classification using line graphics present on the page.

Example 26 includes the subject matter of any one of Examples 15-25, wherein the operations comprise determining the existence of one or more structural elements on the page that are unclassified.

Example 27 includes the subject matter of Example 26, wherein the operations comprise classifying the unclassified one or more structural elements with a given classification by analyzing a pattern of spatially adjacent structural elements on the page each having the given classification.

Example 28 includes the subject matter of Example 26, wherein the operations comprise classifying the unclassified one or more structural elements with a given classification by extending adjacent instance bounds associated with the given classification to include the unclassified one or more structural elements.

Example 29 is a computer program product including one or more non-transitory machine-readable media having instructions encoded thereon that when executed by at least one processor cause a process to be carried out for identifying structural elements of a document, the process comprising: determining location and classification for a structural element on a page of the document using a machine learning (ML) model; determining one or more errors in the location or classification for the structural element; correcting each instance of the one or more errors using document content that is in addition to the structural element, thereby generating a corrected location and/or classification; and storing the document and the corrected location and/or classification.

Example 30 includes the subject matter of Example 29, the process further comprising: generating a structural map of the page of the document based on the corrected location and classification for the structural element; determining a display scheme for the page of the document based on the generated structural map; and causing display of the page of the document using the display scheme.

Example 31 includes the subject matter of Example 29 or 30, wherein determining the location and classification for the structural element comprises determining one or more possible classifications for the structural element, wherein each of the one or more possible classifications includes a corresponding confidence metric.

Example 32 includes the subject matter of Example 31, wherein determining the location and classification for the structural element comprises selecting the classification having the highest confidence metric.

Example 33 includes the subject matter of Example 31, wherein determining the one or more errors occurs in response to the structural element having at least two possible classifications.

Example 34 includes the subject matter of any one of Examples 29-33, wherein correcting each instance of the one or more errors comprises correcting a misclassification of the structural element by analyzing a pattern of spatially adjacent structural elements on the page each having the correct classification.

Example 35 includes the subject matter of any one of Examples 29-34, wherein correcting each instance of the one or more errors comprises correcting a misclassification of a structural element by analyzing a context of the misclassified structural element compared to a context of one or more adjacent structural elements on the page.

Example 36 includes the subject matter of any one of Examples 29-35, wherein determining the one or more errors comprises determining that one or more instance bounds of a first classification overlaps with one or more instance bounds of a second classification.

Example 37 includes the subject matter of any one of Examples 29-36, wherein correcting each instance of the one or more errors comprises correcting a location of one or more instance bounds for a given classification associated with one or more of the structural elements to include adjacent structural elements.

Example 38 includes the subject matter of any one of Examples 29-37, wherein correcting each instance of the one or more errors comprises correcting a location of one or more instance bounds for a given classification associated with one or more of the structural elements to exclude adjacent structural elements having a same associated classification.

Example 39 includes the subject matter of any one of Examples 29-38, wherein correcting each instance of the one or more errors comprises correcting a location of one or more instance bounds for a given classification using one or more line graphics present on the page.

Example 40 includes the subject matter of any one of Examples 29-39, wherein determining the one or more errors comprises determining the existence of one or more structural elements on the page that are unclassified.

Example 41 includes the subject matter of Example 40, wherein correcting each instance of the one or more errors comprises classifying the unclassified one or more structural elements with a given classification by analyzing a pattern of spatially adjacent structural elements on the page each having the given classification.

Example 42 includes the subject matter of Example 40, wherein correcting each instance of the one or more errors comprises classifying the unclassified one or more structural elements with a given classification by extending one or more adjacent instance bounds associated with the given classification to include the unclassified one or more structural elements.

What is claimed is:

1. A method comprising:
   determining instance bounds associated with each of one or more structural elements in a document using a machine learning model;
   determining an error in the instance bounds associated with a particular one of the one or more structural elements;
   correcting the error in the instance bounds associated with the particular structural element using document content associated with the particular structural element, thereby generating corrected instance bounds associated with the particular structural element; and
   generating a structural map of the document based on the corrected instance bounds.

2. The method of claim 1, wherein the error is corrected using a line graphic present in the document.

3. The method of claim 1, further comprising identifying an unclassified structural element in the document, wherein the error is corrected by extending the instance bounds such that the corrected instance bounds encompass the unclassified structural element.

4. The method of claim 1, wherein the instance bounds associated with the particular structural element defines an area on a page of the document.

5. The method of claim 1, wherein determining the error in the instance bounds associated with the particular structural element comprises determining that the instance bounds encompass a structural element that is adjacent to the particular structural element.

6. The method of claim 1, wherein determining the error in the instance bounds associated with the particular structural element comprises determining that the instance bounds intersect the particular structural element itself.

7. The method of claim 1, wherein the document content associated with the particular structural element is spatially adjacent to the particular structural element.

8. A system comprising:
   a memory component; and
   a processing device coupled to the memory component, the processing device to perform operations comprising:

determining instance bounds associated with each of one or more structural elements in a document using a machine learning model;

determining an error in the instance bounds associated with a particular one of the one or more structural elements;

correcting the error in the instance bounds associated with the particular structural element using document content associated with the particular structural element, thereby generating corrected instance bounds associated with the particular structural element; and generating a structural map of the document based on the corrected instance bounds.

9. The system of claim 8, wherein the error is corrected using a line graphic present in the document.

10. The system of claim 8, wherein:

the operations further comprise identifying an unclassified structural element in the document; and the error is corrected by extending the instance bounds such that the corrected instance bounds encompass the unclassified structural element.

11. The system of claim 8, wherein the instance bounds associated with the particular structural element defines a location on a page of the document.

12. The system of claim 8, wherein determining the error in the instance bounds associated with the particular structural element comprises determining that the instance bounds encompass a structural element that is adjacent to the particular structural element.

13. The system of claim 8, wherein determining the error in the instance bounds associated with the particular structural element comprises determining that the instance bounds intersect the particular structural element itself.

14. The system of claim 8, wherein the document content associated with the particular structural element is spatially adjacent to the particular structural element.

15. A non-transitory computer-readable medium storing executable instructions, which when executed by a processing device, cause the processing device to perform operations comprising:

determining an initial classification for each of one or more structural elements in a document using a machine learning model;

determining an error in the initial classification of a particular one of the one or more structural elements;

correcting the error in the initial classification of the particular structural element using document content associated with the particular structural element, thereby generating a corrected classification for the particular structural element; and generating a structural map of the document based on the corrected classification.

16. The non-transitory computer readable medium of claim 15, wherein the operations further comprise:

determining that the document includes an unclassified structural element that the machine learning model was unable to classify despite the unclassified structural element having been processed by the machine learning model; and assigning a classification to the unclassified structural element using document content associated with the unclassified structural element thereby generating a new classification for the previously unclassified structural element, wherein the structural map is further based on the new classification.

17. The non-transitory computer readable medium of claim 15, wherein:

the operations further comprise determining a confidence metric for the initial classification using the machine learning model; and determining the error further comprises determining that the confidence metric is below a threshold confidence.

18. The non-transitory computer readable medium of claim 15, wherein:

the operations further comprise determining a confidence metric for the initial classification using the machine learning model;

determining the error further comprises determining that the confidence metric is below a threshold confidence; and the threshold confidence is selected from a group consisting of 95%, 90%, 85%, 80%, and 75%.

19. The non-transitory computer readable medium of claim 15, wherein:

determining the error further comprises determining that the machine learning model determined a plurality of possible classifications for the particular structural element; and the initial classification is one of the plurality of possible classifications.

20. The method of claim 15, wherein the document content associated with the particular structural element is spatially adjacent to the particular structural element.

* * * * *